(12) United States Patent
Eichinger et al.

(10) Patent No.: US 6,646,725 B1
(45) Date of Patent: Nov. 11, 2003

(54) MULTIPLE BEAM LIDAR SYSTEM FOR WIND MEASUREMENT

(75) Inventors: William E. Eichinger, Iowa City, IA (US); John R. Krieger, Shoreline, WA (US)

(73) Assignee: Iowa Research Foundation, Iowa City, IA (US)

( * ) Notice: Subject to any disclaimer, the term of this patent is extended or adjusted under 35 U.S.C. 154(b) by 0 days.

(21) Appl. No.: 10/193,723

(22) Filed: Jul. 10, 2002

Related U.S. Application Data
(60) Provisional application No. 60/304,602, filed on Jul. 11, 2001.

(51) Int. Cl.[7] .............................. G01P 3/36; G01F 1/712
(52) U.S. Cl. ...................................... 356/28; 73/861.06
(58) Field of Search ......................... 356/28; 73/861.06, 73/861, 861.02

(56) References Cited

U.S. PATENT DOCUMENTS

| | | | |
|---|---|---|---|
| 4,923,298 A | * 5/1990 | Dopheide et al. | |
| 5,255,065 A | 10/1993 | Schwemmer | |
| 5,420,878 A | 5/1995 | Kane et al. | |
| 5,701,172 A | * 12/1997 | Azzazy | 356/28 |
| 5,724,125 A | 3/1998 | Ames | |
| 5,796,471 A | 8/1998 | Wilkerson et al. | |
| 5,872,621 A | 2/1999 | Wilkerson et al. | |
| 5,880,836 A | 3/1999 | Lönnqvist | |
| 6,008,496 A | 12/1999 | Winefordner et al. | |
| 6,034,760 A | 3/2000 | Rees | |
| 6,043,869 A | * 3/2000 | Uno et al. | 356/28 |
| 6,216,540 B1 | 4/2001 | Nelson et al. | |

OTHER PUBLICATIONS

Armstrong et al., "Detection of Atmospheric Particulate Flow Using a Transit–Time Lidar Velocimeter," *Applied Optics*, V. 15, No. 11, pp. 2891–2895 (Nov. 1976).

Azzazy et al., "Flow–Velocity Measurements with a Laser Diode Array," *Applied Optics*, vol. 36, No. 12, pp. 2721–2729 (Apr. 1997).

Derr et al., "A Comparison of Remote Sensing of the Clear Atmosphere by Optical, Radio, and Acoustic Radar Techniques," *Applied Optics*, vol. 9, No. 9, pp. 1976–1992 (Sep. 1970).

Durrani et al., "Spectral Analysis and Cross–Correlation Techniques for Photon Counting Measurements on Fluid Flows," *Applied Optics*, vol. 14, No. 3, pp. 778–786 (Mar., 1975).

Eichinger et al., "A New Method for Measurement of Wind Profiles with a Multiple Beam Lidar," (Apr. 9, 2001).

Eloranta et al., "The Determination of Wind Speeds in the Boundary Layer by Monostatic Lidar," *J. Appl. Meteorology*, vol. 14, No. 8, pp. 1485–1489 (Dec. 1975).

Fiocco et al. "Diagnostic Tools in Atmospheric Physics," Proceedings of the International School of Physics, Course CXXIV, IOS Press (1995).

Hooper et al. "Lidar Measurements of Wind in the Planetary Boundary Layer: The Method, Accuracy and Results from Joint Measurements with Radiosonde and Kytoon," *J. of Climate and Appl. Meteorology*, vol. 25, pp 990–1001 (Jul. 1986).

(List continued on next page.)

*Primary Examiner*—Stephen C. Buczinski
(74) *Attorney, Agent, or Firm*—Needle & Rosenberg, P.C.

(57) ABSTRACT

A system for measuring components of the velocity of wind along two axes that are transverse to the line of sight of the system includes first and second light emitter arrays disposed along crossed first and second axes, respectively, for illuminating the distribution with light, a detector for receiving light backscattered from the distribution, and a controller to activate the arrays, receive detector signals, and calculate the projections of the velocity of the distribution onto the first and second axes. The light emitters of each array can be positioned at irregular distances and provide the system with the capability of discerning the direction of movement of the distribution along the two axes.

37 Claims, 4 Drawing Sheets-

OTHER PUBLICATIONS

Jokinen et al., "On Windowing Effects in Estimating Averaged Periodograms of Noisy Signals," *Measurement*, vol. 28, pp 197–207 (2000).

Kolev et al., "Lidar Determinations of Winds by Particulate Inhomogeneities: Motion Velocity in the Planetary Boundary Layer," *Appl. Optics*, vol. 27, No. 12, pp 2524–2531 (Jun. 1988).

Krieger, J.K., "A Multiple Beam Lidar For Wind Measurement," Ph.D. Thesis, The University of Iowa, Department of Mechanical Engineering (Dec. 2000).

Kunkel et al., "Remote Determination of Winds, Turbulence Spectra and Energy Dissipation Rates in the Boundary Layer from Lidar Measurements," *J. Atmospheric Sci.*, vol. 37, No. 5 (May 1980).

Matsui et al., "Wind Profiling by a Conical–Scanning Time–Correlation Lidar," *Japanese Journal of Applied Physics*, vol. 29, No. 2, pp. 441–444 (Feb., 1990).

Moore et al., "Directional Wind–Measurement From Backscatter Lidar Data In Real–Time," *Laser Radar Technology and Applications: Proceedings of SPIE*, vol. 2748 (Apr. 1996).

Piironen, A.K., "Analysis of Volume Imaging Lidar Signals," Ph.D. Thesis, University of Joensuu, Department of Physics, Vaisala Laboratory, Finland (1994) (http://lidar.ssec.wisc.edu/papers/akp$\_$thes/theisi.htm).

Parvanov et al., "Lidar Measures of Wind Velocity Profiles in the Low Troposphere," 19th International Laser Radar Conference, Annapolis, Maryland (1998).

Press et al., "Numerical Recipes in Pascal—The Art of Scientific Computing" Cambridge University Press (1990).

Sasano et al., "Horizontal Wind Vector Determination from the Displacement of Aerosol Distribution Patterns Observed by a Scanning Lidar," *J. Appl. Meteorology*, vol. 21, pp1516–1523 (Oct. 1982).

Schols et al. "Calculation of Area–Average Vertical Profiles of the Horizontal Wind Velocity From Volume–Imaging Lidar Data," *J. Geophysical Research*, vol. 97, No. D17, pp 18,395,–18,407 (Nov. 30, 1992).

Sroga et al. "Lidar Measurement of Wind Velocity Profiles in the Boundary Layer," *J. Appl. Meteorology*, Vo. 19, No. 5 (May 1980).

The University of Wisconsin (http://lidar.ssec.wisc.edu/syst/vil/vil.htm) (Aug. 2000).

Young et al., "Calculation of Divergence and Vertical Motion from Volume Imaging Lldar Data," *Journal of Geophysical Research*, vol. 100, No. D12, pp. 25,577–25,583 (Dec. 20, 1995).

Vintslav et al., "Lidar Measurements of the Wind Velocity by Spatial Filtering," *Soviet J. Quantum Electronics*, vol. 8, No. 4, pp 442–446 (Apr. 1978).

Eric Weisstein's World of Mathematics (http://mathworld.wolfram.com) (Dec. 2002).

Zuev et al., "Investigation of Structure and Dynamics of Particulate Inhomogeneities in the Ground Layer of the Atmosphere," *Appl. Optics*, vol. 16, No. 8, pp 2231–2235 (Aug. 1977).

\* cited by examiner

MULTIPLE BEAM LIDAR SYSTEM FOR WIND MEASUREMENT

CROSS-REFERENCE TO RELATED APPLICATION

The benefit of the filing date of U.S. Provisional Patent Application Serial No. 60/304,602, filed Jul. 11, 2001, entitled "MULTIPLE BEAM LIDAR SYSTEM FOR WIND MEASUREMENT," is hereby claimed, and the specification thereof incorporated herein in its entirety.

BACKGROUND OF THE INVENTION

1. Field of the Invention

The present invention relates to a system for measuring components of the velocity of a distribution of particulate matter along two axes. More specifically, the system measures a first axis projection and a second axis projection of a velocity of a distribution of particulate matter, such as a dust cloud structure moving with atmospheric wind.

2. Description of the Related Art

The high-resolution measurement of the components, or axial projections, of the velocity of wind in the lower atmosphere is needed for the detection of wind shear at airports, and for scientific investigations of turbulent transport in the atmospheric boundary layer. Radar-based wind profile systems, which are relatively large and expensive, are routinely used for these purposes but offer poor resolution. Sound-based "SODAR" profilers also exist but have short ranges and poor reliabilities.

Some existing light detection and ranging (LIDAR) systems are used to measure wind velocity relying on the sweeping of a single laser beam through an area of interest. Such systems are disclosed in U.S. Pat. No. 5,724,125 to Ames, U.S. Pat. No. 5,796,471 to Wilkerson, and U.S. Pat. No. 5,872,621 to Wilkerson. Each of these LIDAR systems requires a discerning of Doppler shifts in return signals for wind velocity measurements and involves sophisticated, expensive equipment.

Alternative systems and methods have been discussed in literature by Kolev et. al. ("*LIDAR determinations of Winds by Aerosol Inhomogeneities: Motion Velocity in the Planetary Boundary Layer*", Applied Optics, v. 27, n. 12, (June 1988) pp. 2524–2531), and by Parvanov et. al. ("*LIDAR Measurements of Wind Velocity Profiles in the Low Troposphere*," presented at the 19$^{th}$ International Laser Radar Conference, Annapolis, Md., 1998). These publications detail "triple-beam sounding" techniques in which three independent and spatially separated LIDAR devices generate separate signals. The signals are correlated at each altitude to determine the beam-to-beam transit time of particulate distribution structures and the transverse velocities of atmospheric winds carrying the structures. Such techniques suffer the disadvantage of requiring numerous separate LIDAR devices, each device requiring a light detection and data acquisition system.

It would be desirable to provide improved wind measurement systems and methods. The present invention addresses this problem and others in the manner described below.

SUMMARY OF THE INVENTION

The present invention relates to a system for measuring components of the velocity of a distribution of particulate matter along two axes that are transverse to the line of sight of the system. In an embodiment of the invention in which the distribution is dispersed in the atmosphere and wind velocity is to be measured, the line of sight can be essentially vertical. Such a system measures a first axis projection and a second axis projection of a velocity of a distribution of particulate matter, such as a dust cloud structure moving with wind. The system includes first and second light emitter arrays disposed along first and second axes, respectively, for illuminating the distribution with light, a detector for receiving light backscattered from the distribution, and a controller to activate the arrays, receive detector signals, and calculate the projections of the velocity of the distribution onto the first and second axes. The light emitters of each array can be positioned at irregular distances and provide the system with the capability of discerning the direction of movement of the distribution along the two axes.

In one embodiment of the invention, the light emitters are positioned along crossed axes to define a pair of crossed arrays and the irregular position distances of one array are different from the irregular position distances of the other array. The controller activates the arrays to illuminate the distribution in alternating fashion and correlates the storage of data for both arrays with a signal pulse sequence from a single detector. Each of the arrays can include a light source, such as a laser, optically coupled to a succession of beam splitters divergently aimed to illuminate the distribution.

A method is disclosed for measuring a first axis projection and a second axis projection of a velocity of a distribution of particulate matter. In one embodiment the method includes repeatedly and in alternating fashion generating pulses of light beams disposed along two axes, receiving backscattered light associated with each pulse using a detector, and determining the projections of the velocity of the distribution along the two axes by calculating a logarithm of a ratio of the Fourier transforms of detector signals.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

Figure 1:
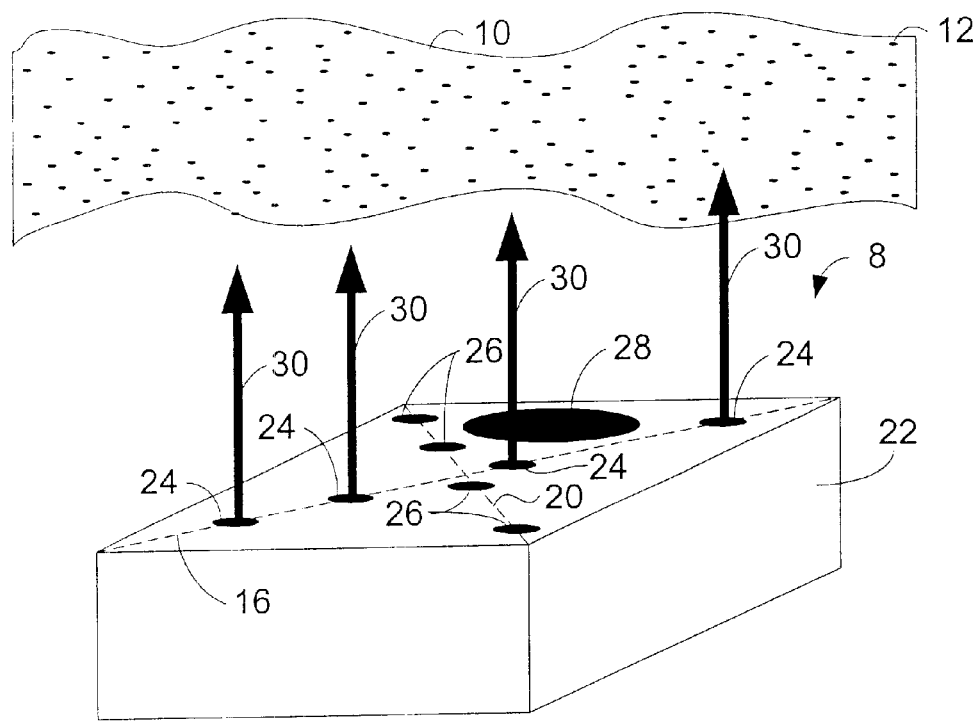
FIG. 1 is a perspective view of an embodiment of a system for measuring axial projections of a velocity of a distribution of particulate matter.
Figure 2:
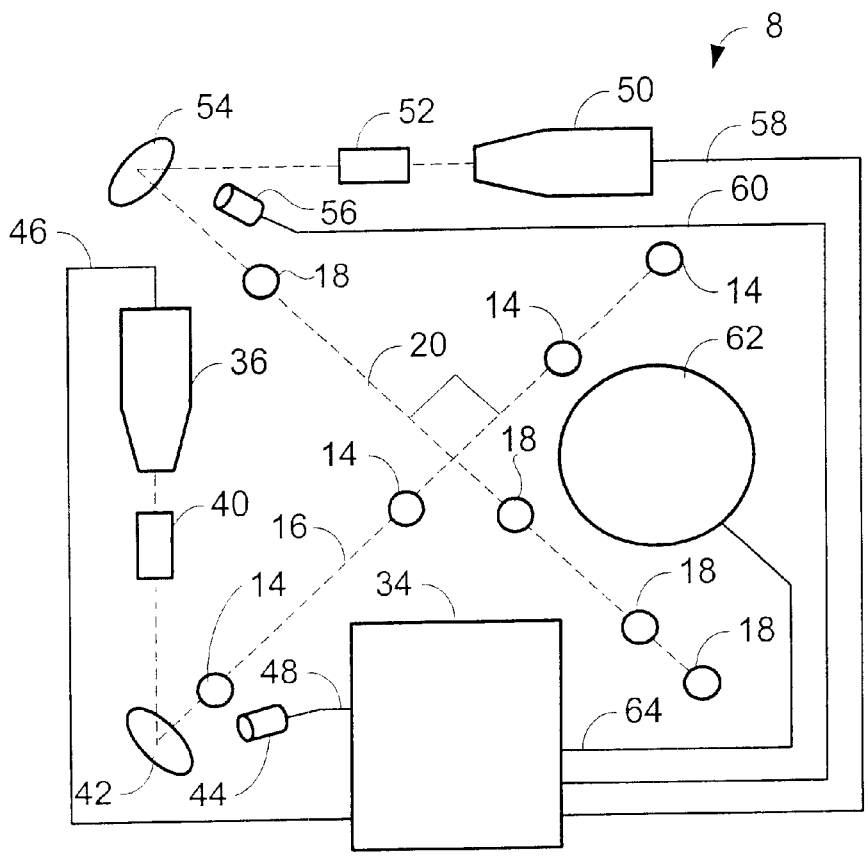
FIG. 2 is a block diagram of the system of FIG. 1.

As illustrated in FIGS. 1 and 2, a system 8 for measuring axial components of a wind carrying an inhomogeneous distribution 10 of suspended particles 12 includes any suitable number of first light emitters 14 disposed along a first axis 16 and similarly, second light emitters 18 disposed along a second axis 20. First light emitters 14 can be disposed along first axis 16 at irregular distances from one another for reasons discussed below. Similarly, second light emitters 18 can be disposed along second axis 20 space from one another at irregular distances that can be different from the irregular distances of the first light emitters 14. First and second light emitters 14 and 18, respectively, which are aimed to illuminate distribution 10 upon activation, can be conveniently arranged within a single system housing 22 which, if provided, includes first and second emitter apertures 24 and 26, respectively, and at least one detector aperture 28. A first send pulse defined by first light beams 30 is illustrated in FIG. 1 emanating from first emitter apertures 24 to illuminate distribution 10 and cause a first light signal to be scattered from particles 12 and enter detector aperture 28.

System 8, illustrated in block diagram form in FIG. 2, further includes a controller 34 which controls the activation of each of first and second light emitters 14 and 18, respectively. In the illustrated embodiment, controller 34 is electrically coupled to a first light source 36 which is optically coupled to each of first light emitters 14 through an optical pathway that includes a first beam expander 40 and a first beam reflector 42. A first beam monitor 44 can be positioned and aimed to receive light scattered from first beam reflector 42. Electrical connections 46 and 48 couple first light source 36 and first beam monitor 44, respectively, to controller 34.

A second light source 50 can be optically coupled to each of second light emitters 18 through an optical pathway that includes a second beam expander 52 and a second beam reflector 54. Second light source 50 and a second beam monitor 56 can be electrically coupled to controller 34 through electrical connections 58 and 60, respectively.

System 8 further includes a detector 62 for receiving light signals scattered from particles 12 and entering detector aperture 28 (FIG. 1) and for producing detector signals in response to light signals received. Detector 62 can be electrically coupled to controller 34 through an electrical connection 64.

First and second light emitters 14 and 18 are disposed along mutually non-parallel first and second axes 16 and 20, respectively. System 8 can be constructed such that the first and second axes 16 and 20, respectively, cross at a position between two first light emitters 14 and two second light emitters 18 as illustrated in FIG. 2 to provide, among other advantages, a compact assembly within system housing 22. In other words, the first and second light emitters can form a pair of crossed arrays. In the illustrated embodiment, the crossed arrays are mutually perpendicular for the measurement of mutually perpendicular vector wind components. Nevertheless, as those skilled in the art to which the invention pertains, other non-parallel arrangements can be effected without departing from the scope of the invention.

Figure 3:
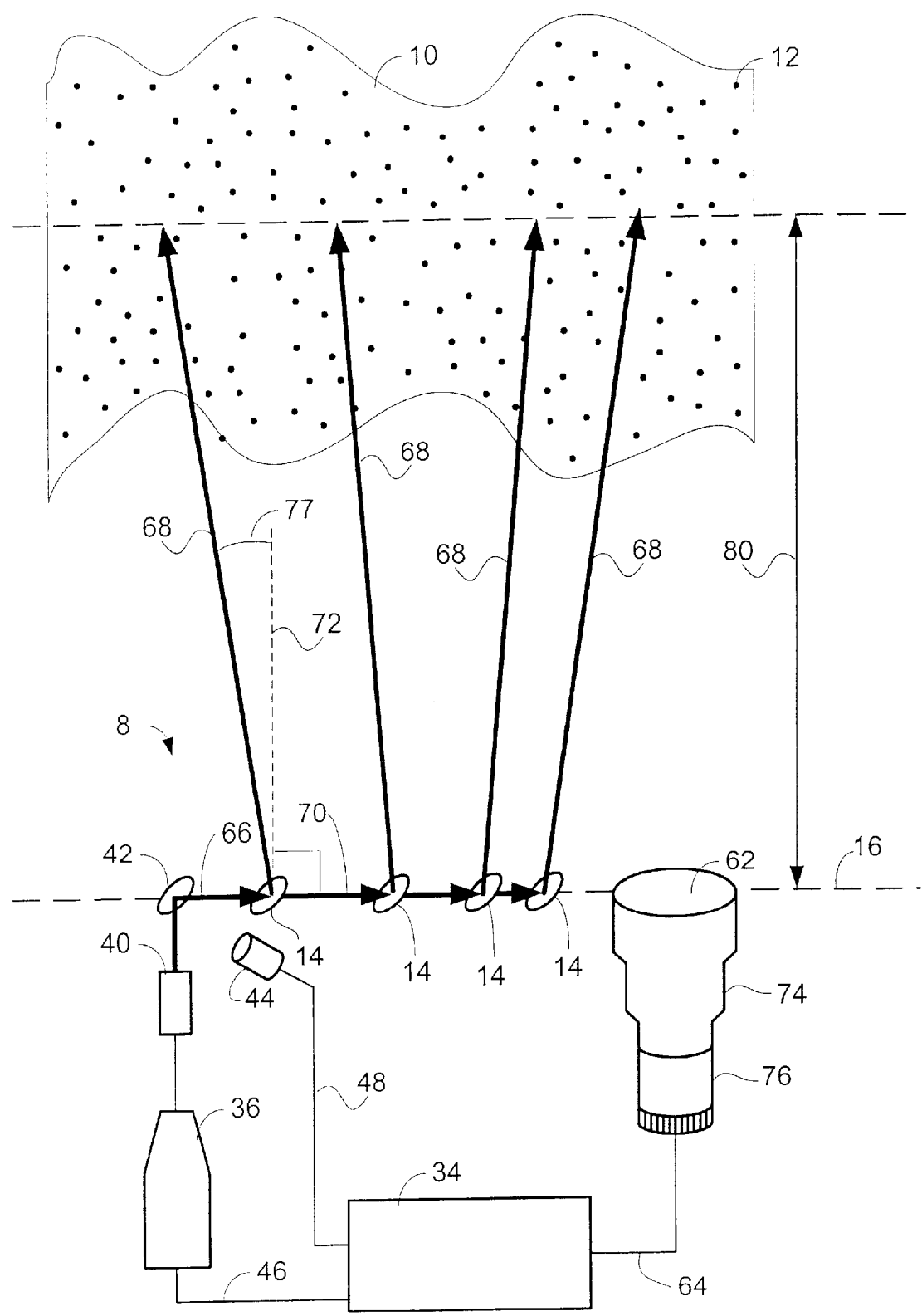
FIG. 3 illustrates the operation of the system of FIG. 1.

In FIG. 3, the components of system 8 pertaining directly to first light emitters 14 are illustrated and are discussed below in detail. Those components of system 8 pertaining directly to second light emitters 18 can be similarly constructed and arranged. Furthermore, as those skilled in the art may appreciate, FIG. 3 illustrates a single axis embodiment of a system for measuring a single axis projection of the velocity of a distribution 10. In FIG. 3, first light source 36 is illustrated as activated by controller 34 through connection 46. A light beam output by first light source 36 is expanded by first beam expander 40 to reduce the divergence of the laser beam. The expanded beam emanating from first beam expander 40 can be optically coupled through first beam reflector 42 to first light emitters 14 which, in the illustrated embodiment, are optical beam splitters arranged in succession along the first axis 16. Each optical beam splitter directs a portion of an incident beam 66 as a range beam 68 and transmits a remaining portion 70 of incident beam 66 to a beam splitter following in the succession along the first axis.

Each range beam 68 is directed substantially along a range axis 72 which is substantially perpendicular to first axis 16. The final first light emitter 14 in the succession along the first axis can be a beam splitter or a total reflector. Note that although in the illustrated embodiment each first emitter 14 is not only disposed along first axis 16 but is also on first axis 16, in other embodiments some or all of first light emitters 14 can be spaced from first axis 16 at some distance along range axis 72 provided that the optical pathways and calculations support such an arrangement. In other words, first light emitters 14 may not need to be physically positioned along a common line.

Range beams 68 together define a send pulse of light beams aimed at the distribution 10. Light from the send pulse is scattered by the particles 12 of the distribution 10 and returned to the system 8 to be received by the detector 62 which can include a telescope 74 optically coupled to a photomultiplier tube (PMT) 76 or a solid state diode detector. Controller 34 receives through connection 64 an electrical detector signal pulse 78 (FIG. 4) produced by PMT 76 in proportion to the light received by telescope 70. First beam monitor 44 receives light scattered from first beam reflector 42 and produces an electrical signal representing the intensity of the output of first light source 36 and provides the electrical signal to controller 34 through electrical connection 48.

A close spacing of first light emitters 14 along first axis 16 provides for a conveniently sized system housing 22 (FIG. 1). However, the spacings between range beams 68 define the discernable scale of the structures within the distribution 10 (FIG. 3) as detailed below. Each array of first light emitters 14 can be spaced and aimed to nearly fill the field of view of detector 62. Though each range beam 68 is substantially perpendicular to first axis 16, a slight divergence angle 77 of several milliradians can be included in the orientation of each first light emitters 14 with respect to range axis 72. For example, an array of range beams 68 with a width of 50 centimeters at system 8 can reach a width of three meters at a 100 meter range distance 80. A structure traveling at 3 m/s would thus cross the array in one second. Sampling durations of several minutes could be sufficient to perform averaging of Fourier transforms, detailed below, over many intervals at a 100 meter altitude. Altitudes higher than 100 meters could contain wider arrays of range beams 68, and longer sampling times could be used. The locations of range beams 68 along first axis 16 can be calculated at any altitude according to the known positions of first light emitters 14 along first axis 16 and the known divergence angles of the beams. In preferred embodiments of the invention, the arrays of first and second light emitters 14 and 18, respectively, are each asymmetric, and differ from each other.

FIGS. 2 and 3 illustrate exemplary embodiments of the invention and are not intended to limit the scope of the invention. These and other embodiments (not illustrated) can include any suitable arrangement and number of light sources, light emitters, optical devices, optical and electrical couplings, and ancillary electronics. In the illustrated embodiments of FIGS. 2 and 3, a single first light source provides an optical beam to each of the first light emitters. In other embodiments, each of first light emitters 14 can comprise a light source electrically coupled to controller 34. Also, the functions of controller 34 can be distributed over multiple electronic subsystems or components. FIGS. 2 and 3 illustrate a single detector 62 for receiving light scattered from the particles 12 of the distribution 10 though range beams 68 alternately illuminate the distribution 12 from each of first and second light emitters 14 and 18, respectively, as detailed below. In other embodiments (not illustrated) any suitable number detectors could be utilized including light collection and detection alternatives to telescope 74 and PMT 76.

In one embodiment, first and second light sources 36 and 50 (FIG. 2), respectively, each comprises a conventional laser source or other light source that can be collimated or provided with a collimating optical device to effect a beam of light. A power supply for each can be provided with or within controller 34. Exemplary conventional lasers fire 10 nanosecond pulses of 1.064 µm wavelength light at a rate of 50 Hz. The pulse energies can be adjustable and can be operated in the range of 50 milliJoules (mJ) per pulse. The controller can provide that each laser be activated upon the receipt of a slightly delayed synchronization signal from the other, to ensure nearly simultaneous measurements from each array, but without overlapping. The lasers may be selected from any suitable known types of lasers, which may include, but are not limited to the CFR-200 models from Big Sky Laser Technologies, Inc. In alternative embodiments (not shown), first and second light sources 36 and 50, respectively, can comprise a single laser source provided with switching optical coupling elements for alternate activation of first and second light emitters 14 and 16, respectively.

Detector 62 can include a 10" telescope 74 with a 3° field of view, at the focus of which can be positioned a photodetector, such as PMT 76 with a conventional dynode chain and any suitable pre-amplifier and/or amplifier devices.

Figure 4:
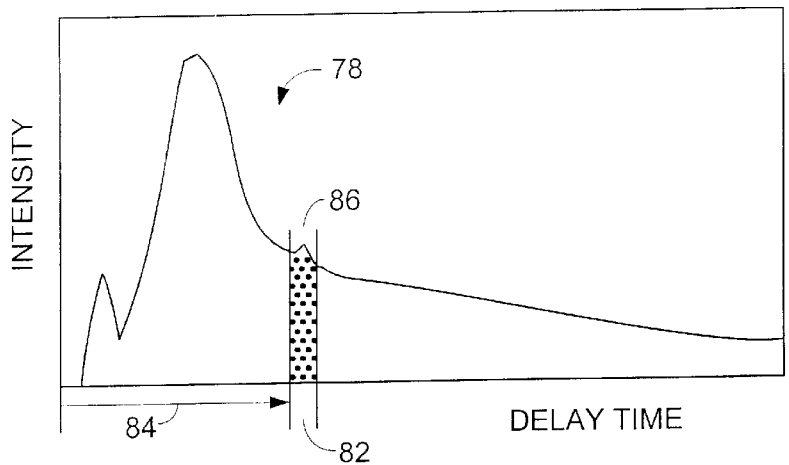
FIG. 4 illustrates a signal pulse from the detector of the system of FIG. 1.

An exemplary detector signal 78, illustrated in FIG. 4, represents a return pulse of scattered light from a single send pulse as received by detector 62 (FIG. 3). Detector signal pulse 78 has an intensity which varies as a function of delay time after the emission of a send pulse of range beams 68. A typical send pulse can have a duration of approximately 10 nanoseconds (ns) and an approximate corresponding spatial length of 3 meters (m). As the send pulse travels away from system 8, suspended particles 12 of distribution 10 at an increasing range distance 80 (FIG. 3) from system 8 are illuminated by the traveling send pulse causing the scattering of light back toward system 8 and detector 62. Thus, the scattered light intensity measured within a small time interval 82 at a delay time 84 following a send pulse provides a relative measure of the concentration of suspended particles 12 of distribution 10 at a distance reached by the send pulse in half of the delay time 84. Detector signal pulses may be range corrected with a multiplicative factor proportional to the square of the range distance applied to the intensity axis. In such applications of system 8 wherein first and second axes 16 and 20, respectively, together define a horizontal plane, range axis 72 defines a vertical axis in the airspace above system 8 and range distance 80 defines an altitude above system 8.

For example, the small relative peak 86 in detector signal pulse 78 measured at a delay time 84 of approximately 2.4 microseconds (µs) after a send pulse can represent a layer of relatively dense particle concentration in a cloud or dust distribution at an altitude of 360 m above system 8 reached by the send pulse approximately 1.2 µs after activation. The activation of a send pulse of range beams 68 and the detection of a return pulse represented by detector signal pulse 78 can be repeated to provide for the analysis of the time evolution of the distribution 10 above system 8 as a function of range distance 80 (FIG. 3).

Figure 5:
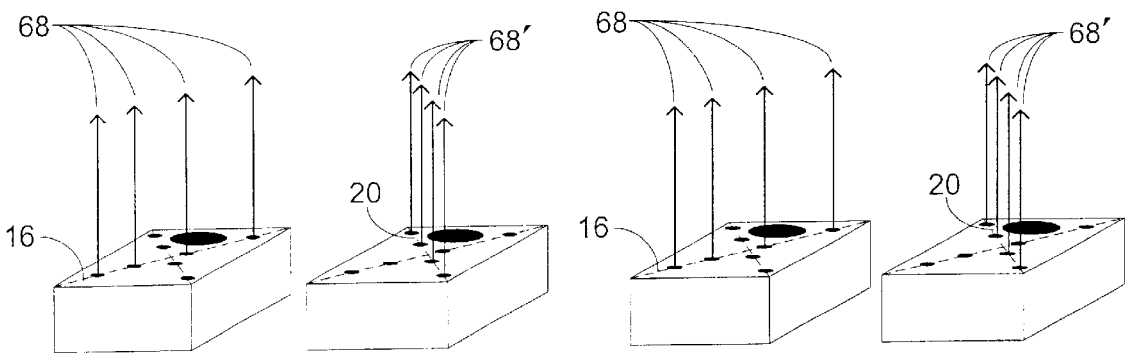
FIG. 5 is a series of perspective views of the system of FIG. 1 with light emitters along first and second axes activated in alternating fashion.
Figure 6:
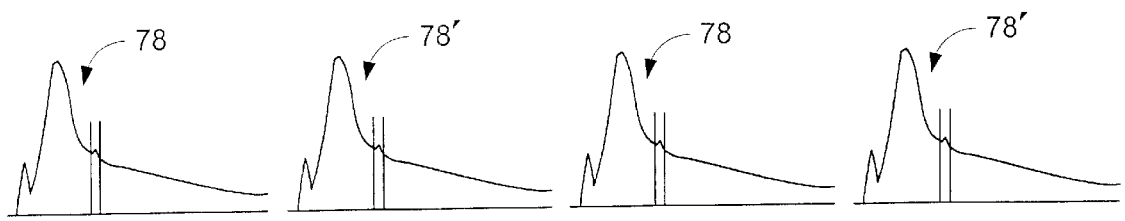
FIG. 6 is a series of signal pulses effected by the activation of the light emitters of FIG. 5.

FIG. 5 illustrates the relative timing of the repeated generation of send pulses of range beams 68, and FIG. 6 provides a corresponding timing diagram for the repeated receipt of return pulses and production of detector signal pulses 78. In FIG. 5, send pulses of range beams 68 and 68' are emitted along the first and second axes 16 and 20, respectively, in alternating fashion to alternately illuminate distribution 10 (FIG. 3). Correspondingly, in FIG. 6, detector signal pulses 78 and 78' are produced in alternating fashion in response to the light from range beams 68 and 68' backscattered by distribution 10. Detector signal pulses 78 and 78' are recorded by a data storage device within controller 34. The stored data can be analyzed as detailed below to gain information on the time evolution of the distribution 10 as a function of distance from system 8. Patterns in the data can reveal the speed and direction of wind currents carrying the distribution as a function of altitude above the system.

Figure 7:
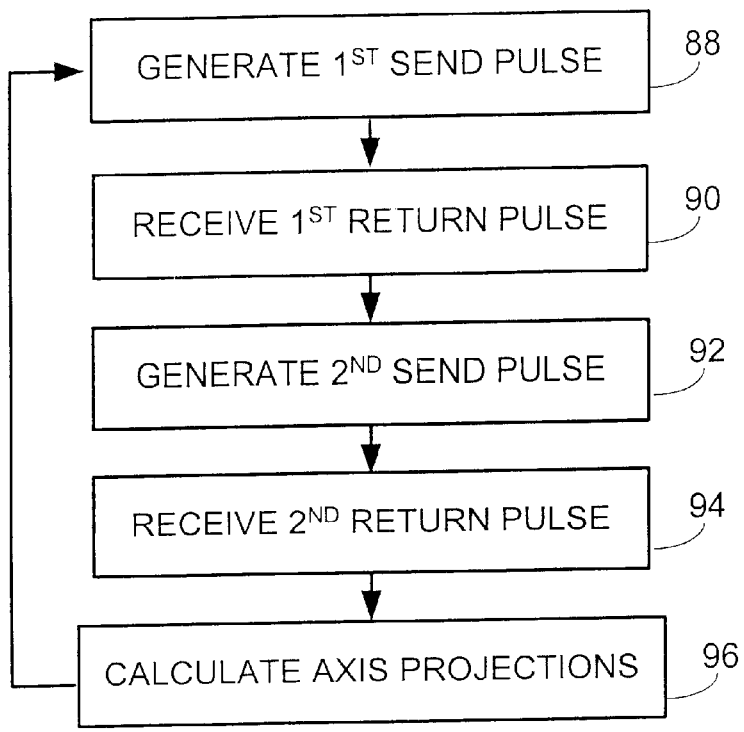
FIG. 7 is a flow diagram illustrating a method for measuring axial projections of a velocity of a distribution of particulate matter.

Methods of measuring a first axis projection and a second axis projection of a velocity of a distribution of particulate matter using the embodiments of the invention described above perhaps can be more readily understood with reference to the flow diagram of FIG. 7. At step 88 a first send pulse is generated and emitted by first light emitters 14 (FIG. 2). The first send pulse includes at least three first light beams disposed along first axis 16 (FIG. 2) at irregular distances from one another. The first light beams are substantially perpendicular to the first axis and aimed at the distribution to cause a first return pulse, corresponding to a particular first send pulse, to be reflected from the distribution. At step 90 the first return pulse is received with a detector and a first detector signal pulse, such as detector signal pulse 78 (FIG. 4), representing the first return pulse, is produced.

At step 92 a second send pulse is generated and emitted by second light emitters 18 (FIG. 2). The second send pulse includes at least three second light beams disposed along second axis 20 (FIG. 2) at irregular distances from one another. The second light beams are substantially perpendicular to the second axis and aimed at the distribution to cause a second return pulse, corresponding to the second send pulse, to be reflected from the distribution. At step 94 the second return pulse is received with a detector and a second detector signal pulse 78 (FIG. 4), representing the second return pulse, is produced.

The pair of steps 88 and 90 and the pair of steps 92 and 94 are repeated. The repeating of steps 88 and 90 accumulates data effected by first light emitters 14 (FIG. 3). The real time elapsed in the repeating of these steps allows for movement of distribution 10 along first axis 16 (FIG. 3). In other words, steps 88 and 90 together effect and collect data and therefore are executed together in close succession. The accuracy and precision of the performance of the method illustrated in FIG. 7 depend on the chosen elapsed time and frequency in repeating the pair of steps 88 and 90. Too few a number of iterations may produce data of poor quality in the statistical procedures and curve fitting discussed below. Too long an elapsed time may allow significant evolution of the structure of the distribution 10 and may result in meaningless spurious correlations in unrelated signals. A selection or optimization to meet the conditions at hand is needed. Similarly, the repeating of steps 92 and 94 allows for movement of distribution 10 along second axis 20 and accumulates data effected by second light emitters 18. Like steps 88 and 90, steps 92 and 94 are executed together in close succession.

In one embodiment, the method of FIG. 7 provides that each single iteration of pairwise steps 88 and 90 is followed by an iteration of pairwise steps 92 and 94. Such an embodiment provides that X-array and Y-array data, as discussed below, remain correlated, as preferred, as structure fluctuations in distribution 10 pass over system 8. Other embodiments may provide alternate repeating sequences without departing from the scope of the invention.

At step 96, the first axis projection and the second axis projection of the velocity of the distribution are calculated as detailed below in response to the repeatedly produced first and second detector signals.

In one embodiment, the production of a first detector signal pulse at step 90 includes producing a net first detector signal using a background function. A background function can be calculated; for example, by averaging a multiplicity of previous first detector signals corresponding to the farthest range distance and subtracting the resultant average value from each subsequent first detector gross signal to produce a first detector net signal. Other background functions can be calculated as known by those skilled in the art to which the invention pertains.

In one embodiment, the method of FIG. 7 includes repeatedly receiving the first return pulses comprises sampling each first return pulse at a plurality of predetermined time intervals following the corresponding first send pulse, and wherein repeatedly receiving the second return pulses comprises sampling each second return pulse at a plurality of time intervals following the corresponding second send pulse, and wherein calculating the first axis projection and the second axis projection comprises calculating a plurality of first axis projections and second axis projections, wherein each projection is calculated in response to a plurality of the first and second return pulses sampled at the same time interval as eachother, whereby each time interval corresponds to an altitude at which the projections are calculated. In other words, the delay time axis of FIG. 4 is sampled and analyzed as a plurality of predetermined time intervals. Each such time interval is appreciated as corresponding to a particular range distance 80 (FIG. 3) or altitude. The accumulation and analysis of data from many return pulses sampled at a particular time interval provides for the calculation of axis projections at the corresponding range distance or altitude.

A simple conceptual method of measuring wind speed with beam arrays would be to use regularly spaced beams to induce periodicity in the time evolution of the detector signals as apparent structures in the distribution of particles cross each beam at regular intervals. Determining the wind speed along the array would then presumably be a simple matter of locating the dominant frequency in the power spectrum of the detector signals. However, such an approach offers an unavoidable directional ambiguity: the dominant frequency in the power spectrum will reveal how fast the structures move through the array of range beams, but not which way the structures move. This directional ambiguity is due in part to the fact that the power spectrum does not carry phase (i.e. temporal offset) information.

To overcome the directional ambiguity problem discussed above, a method of the present invention can induce asymmetric patterns in the detector signals, these patterns can be identified retaining all spectral information, and the effects of the natural particulate distribution can be accounted for. Directional ambiguity can be eliminated and confusion in the spectral analysis can be reduced. First light emitters 14 (FIGS. 2 and 3) can be disposed along first axis 16 at irregular distances from one another to provide for the elimination of such directional ambiguity. Similarly, second light emitters 18 can be disposed along second axis 20 space from one another at irregular distances that can be different from the irregular distances of the first light emitters 14.

Consider the manner in which an array with a certain profile (pattern of beams) modulates the detector signals effected by a certain moving particulate distribution. In rough terms, the particulate distribution will be "smeared out" by the width of the array, with a "smearing function" corresponding to the array profile. In the ideal limit of point beams, the "smeared" function would simply be the superposition of the particulate distribution upon itself several times, each time shifted by a certain amount. In mathematical terms, the composite signal is the convolution of the particulate distribution with the array profile. The Fourier transform of a convolution equals the product of the Fourier transforms. Therefore, the transform of the multibeam LIDAR signal will correspond to the product of the transforms of the particulate distribution and the array profile. The array profile in physical space will be known, and will have a meaningful transform in frequency space containing the wind information. The particulate distribution is unknown, and its transform effectively scrambles the transform of the array. Knowledge of the distribution is necessary in order to unscramble the array's transform and recover the wind information.

One way to determine the particulate distribution would be to measure it by operating a single LIDAR beam separately. One could then compare the "compound" signal from each array to the "elementary" signal from the single beam to determine the modulation. This is in principle straightforward, but requires the concurrent production of three LIDAR-signals to obtain a two-dimensional wind vector, thus eliminating some of the advantages of a multibeam system. However, the necessary number of signals can be reduced to two if one recognizes that the signals from the two arrays can be used to unscramble each other. More precisely, in the ratio of the transforms of the signals from two arrays, the transforms of the dust distribution cancel out, leaving only the ratio of the transforms of the two arrays, which will be a unique function of wind velocity and angle. The uniqueness may depend on having dissimilar and asymmetric arrays.

The time-evolving detector signal effected by an array of LIDAR beams at a certain altitude will depend on the arrangement of beams and the speed and orientation of the wind at that altitude. Knowing the beam arrangement, one can calculate the wind vector from the recorded detector signals. Consider data obtained from a given altitude from the two mutually perpendicular arrays described above(call them the X-array and the Y-array) having arbitrary but known beam strengths and positions, with the horizontal wind direction oriented at some angle θ with respect to one of the arrays, as depicted in FIG. 8.

If the turbulent structures may be treated as "frozen", then the signals produced by the arrays will be generated by some unknown, but fixed, spatial distribution of particulates passing across the beam arrays in the direction of the line of motion. If one further assumes purely horizontal motion and ignores fluctuations in the particulate distribution transverse to the line of motion, then for analysis purposes the particulate distribution is essentially one-dimensional along the line of motion. Transverse fluctuations are not in general negligible, but their effects may be averaged out and their effects are an inherent problem in any correlation LIDAR method. With a one-dimensional distribution, one may consider the particulates as passing through shortened arrays along the line of motion, rather than passing through the full arrays at some angle, and the problem becomes entirely one-dimensional. This model of a one-dimensional particulate distribution passing through apparent, scaled arrays along the line of motion underlies all further analysis of the multibeam LIDAR signals. Note that one of the quantities of interest—the angle of the line of motion—determines the relative scaling of the apparent, shortened arrays, while the wind velocity determines the absolute scaling in time.

Figure 8:
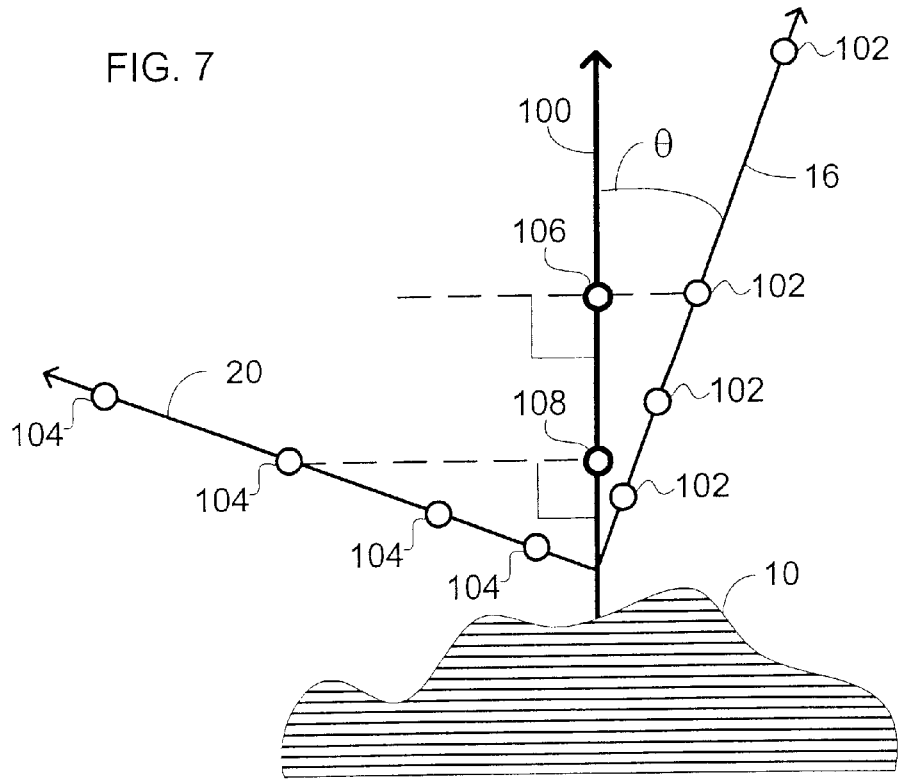
FIG. 8 illustrates a distribution of particulate matter moving along the axes of the system of FIG. 1.

FIG. 8 illustrates a patterned particulate matter distribution 10 moving at a velocity V carried by a wind moving along a line of motion 100 at an angle θ with respect to the first axis 16. For convenience below, first axis 16 is referred to as the X-axis, and the array of X-axis beams 102 from first light emitters 14 (FIG. 2) is referred to as the X-array. Each X-axis beam 102 has a position $x_j$ along the X-axis, where the index j indicates a particular beam 102. Similarly, a Y-array of Y-axis beams 104 are disposed along second axis 20 at positions $y_l$. The axis of line of motion 100 is referred to below as the Z-axis. Each of X-axis beams 102 and Y-axis beams 104 has a position 106 and 108, respectively, along the Z-axis which is referred to below as $z_j$ and $z_l$, respectively, where $z_j = x_j \cos(\theta)$, and $z_l = y_l \sin(\theta)$. The X-array and Y-array illustrated in FIG. 8 are not shown as crossed for simplicity.

The intensities of the various beams will be denoted by $a_i$. For mathematical purposes, it will also sometimes be helpful to view the arrays as single entities with continuous intensity profiles, denoted by A(x) or A(y) for the actual arrays, or a(z) for a scaled array.

Consider the X-array, which produces a signal $S_x(t)$. At any given instant, the signal strength can be calculated as the integrated effect along the line of motion of the illumination intensity multiplied by the scattering intensity:

$$S_x(t) = \int_{-\infty}^{\infty} a_x(z) D_o(z - Vt) dz \qquad 1$$

where $D_0(z)$ is the scattering intensity distribution function along the Z-axis at an arbitrary time t=0 and D(z,t) is the scattering intensity distribution function along the Z-axis as a function of time. The functions $D_0(z)$ and D(z,t) are each related and approximately proportional to the particulate matter density function in the Z direction along the line of sight of system.

Apart from the mixing of dimensions in the independent variables, due to the scaling by velocity, this signal is just the convolution of the array profile with the particulate distribution. Taking the Fourier transform of this convolution yields $$F_f[S_x(t)] = \int_{-\infty}^{\infty} e^{-2\pi i f t} \left[\int_{-\infty}^{\infty} a_x(z) D_o(z - Vt) dz\right] dt \qquad 2$$

$$= \int_{-\infty}^{\infty} a_x(z) \int_{-\infty}^{\infty} e^{-2\pi i f t} D_o(z - Vt) dt dz$$

$$= \int_{-\infty}^{\infty} a_x(z) \int_{-\infty}^{\infty} e^{-2\pi i \frac{f}{V}(z-u)} D_o(u) \left(\frac{-du}{V}\right) dz$$

$$= \frac{1}{V}\left[\int_{-\infty}^{\infty} a_x(z) e^{-2\pi i \frac{f}{V} z} dz\right]\left[\int_{-\infty}^{\infty} D_o(u) e^{-2\pi i \frac{f}{V}(-u)} d(-u)\right]$$

$$F_f[S_x(t)] = \frac{1}{V} F_{\frac{f}{V}}[a_x(z)] F_{\frac{f}{V}}[D_o(-u)]$$

In other words, the Fourier transform of one array's signal will equal the transform of that array's apparent profile, multiplied by the transform of the particulate distribution and by a scaling factor, with each transform scaled by V. The wind angle manifests itself in the scaling of the apparent array, and the wind speed appears in the scaling of the independent variable. The variable u is a dummy variable of integration standing for z-Vt. The independent variable in the spatial transforms f/V has units of inverse length and represents a wavenumber. Similarly, for the Y-array, $$F_f[S_y(t)] = \frac{1}{V} F_{\frac{f}{V}}[a_y(z)] F_{\frac{f}{V}}[D_o(-u)] \qquad 3$$

The particulate distribution is unknown and serves to obscure the interesting wind information. However, in the Fourier transform ratio (FTR), the dependence on the unknown particulate distribution disappears:

$$\frac{F_f[S_x(t)]}{F_f[S_y(t)]} = \frac{\frac{1}{V} F_{\frac{f}{V}}[a_x(z)] F_{\frac{f}{V}}[D_o(-u)]}{\frac{1}{V} F_{\frac{f}{V}}[a_y(z)] F_{\frac{f}{V}}[D_o(-u)]} = \frac{F_{\frac{f}{V}}[a_x(z)]}{F_{\frac{f}{V}}[a_y(z)]} \qquad 4$$

In other words, the ratio of transforms of the two time signals will be the same as the ratio of transforms of the two projected arrays, scaled by the wind velocity. Information from the two arrays has now been mixed together, but this does not represent a problem, as the ratio remains a unique function of wind speed and angle.

If each array profile is simply assumed to be the superposition of several identical beam profiles, such as Gaussian, and each scaled array is simply the same superposition with reduced beam spacings, equation 2 can be simplified even further. Note that this assumes circularly symmetric beam profiles. If $a_k$ is the strength of each beam, $z_k$ the scaled apparent position of each beam, and f(z) the normalized intensity profile of an individual beam centered at z=0, then using the linearity of Fourier transforms, the dependence on the beam profiles will factor out of the sums as follows:

$$F_{\frac{f}{V}}[a(z)] = F_{\frac{f}{V}}\left[\sum a_k f(z - z_k)\right]$$

$$= \sum a_k F_{\frac{f}{V}}[f(z - z_k)]$$

$$= \sum a_k F_{\frac{f}{V}}[f(z)] e^{-2\pi i \frac{f}{V} z_k}$$

$$= F_{\frac{f}{V}}[f(z)] \sum a_k e^{-2\pi i \frac{f}{V} z_k}$$

Thus in the FTR of the X-array signal and Y-array signal, the beam profile dependence will cancel as well, and all that will be left will be a ratio of sums of amplitude and phase factors for each beam (if the beams are all the same strength, even the amplitude factors will cancel out):

$$\frac{F_f[S_x(t)]}{F_f[S_y(t)]} = \frac{F_f[a_x(z)]}{F_f[a_y(z)]} = \frac{\sum_{X\text{-array}} a_j e^{-2\pi i \frac{f}{V} z_j}}{\sum_{Y\text{-array}} a_l e^{-2\pi i \frac{f}{V} z_l}} \quad (5)$$

Finally, the scaled-array beam locations $z_j$ and $z_l$ will be simply related to the known un-scaled array beam positions $x_j$ and $y_l$ through the wind angle $\theta$.

$z_j = x_j \cos(\theta)$ $z_l = y_l \sin(\theta)$

Substituting in, $$\frac{F_f[S_x(t)]}{F_f[S_y(t)]} = \frac{\sum a_j e^{-2\pi i f x_j \frac{\cos(\theta)}{V}}}{\sum a_l e^{-2\pi i f y_l \frac{\sin(\theta)}{V}}} \quad (6)$$

Or, defining the scaling parameters $c_1$ and $c_2$, $$\frac{F_f[S_x(t)]}{F_f[S_y(t)]} = \frac{\sum_{x\text{-array}} a_j e^{-i\omega x_j c_1}}{\sum_{y\text{-array}} a_l e^{-i\omega y_l c_2}} \quad \text{with} \quad (7)$$

$c_1 = \dfrac{\cos(\theta)}{V}$ $c_2 = \dfrac{\sin(\theta)}{V}$ $\omega = 2\pi f$ With this equation relating two complex functions of frequency, the two LIDAR array signals have been related to the wind velocity and direction. On the left hand side of this equation is the ratio of Fourier transforms of the time signals, which can be easily calculated for a given data set. On the right hand side is a calculable function of the known beam strengths and locations, and of two unknown scaling parameters, which depend on the wind velocity and direction. If the scaling factors can be determined, the wind velocity can be calculated from:

$$V = \frac{1}{[c_1^2 + c_2^2]^{1/2}} \quad (8)$$

$$\theta = \arctan\left[\frac{c_2}{c_1}\right]$$

Thus the problem is reduced to the determination of $c_1$ and $c_2$. The FTR is calculable from the LIDAR time signals, and is a complex function of frequency and the two scaling parameters. For simplicity, let's denote the FTR of two multibeam LIDAR signals as G:

$$G(f, c_1, c_2) \equiv \frac{F_f[S_x(t)]}{F_f[S_y(t)]} = \frac{\sum_j a_j e^{-i\omega x_j c_1}}{\sum_l a_l e^{-i\omega y_l c_2}} \quad (9)$$

If the two velocity constants are known, G can easily be calculated for any given frequency. Unfortunately, the inverse problem exists: G can be determined numerically from the LIDAR data, and the two velocity constants are desired. The function is highly nonlinear and implicit in the two constants, so it can't be inverted directly. This leaves a best-fit regression technique. The values of $c_1$ and $c_2$ which provide the best fit of the transformed data to $G(\omega, c_1, c_2)$ must be determined in order to calculate the wind velocity.

Normal regression procedure is to define a measure of the error as a function of the unknown parameters, usually the sum of squares of the deviations at each data point, and locate the minimum by locating the point of zero gradient. The transform ratio as written is extremely non-linear, and one can expect a plethora of local minima, maxima, and saddle points in the error function, making it very laborious and computationally expensive to locate the global minimum. Thus, a way of simplifying or approximating the ratio in an easier form to work with is desirable.

Notice that the Fourier transform ratio G, like an ordinary Fourier transform, has the property that it always begins at the same place, a fixed positive real number. If one substitutes $\omega = 0$ into the formula for G, one can see that all of the exponentials become one, and G becomes simply the sum of the X-array beam intensities divided by the Y-array beam intensities, or in other words, the ratio of array strengths, which will be defined as R. More generally, the value of a Fourier transform at zero frequency is simply the DC component of the signal, the sum of all the data points in a discrete transform.

$$G(0, c_1, c_2) = \frac{\sum_j a_j e^{(0)}}{\sum_l a_l e^{(0)}} = \frac{\sum_j a_j}{\sum_l a_l} \equiv R \quad (10)$$

R maybe considered as a zero order approximation to G. Unfortunately, this may not be useful in the determination of the velocity parameters. However, for nonzero but very small frequencies, one can expand about this point to first order using $e^{i\theta} \cong 1 + i\theta$ along with the mean beam positions, defined as $$\vec{x} \equiv \frac{\sum_j a_j x_j}{\sum_j a_j}, \quad (11)$$

$$\vec{x} \equiv \frac{\sum_l a_l y_l}{\sum_l a_l}$$

Thus a first order approximation to G will be $$G(\omega, c_1, c_2) \approx \frac{\sum_j a_j(1 - i\omega x_j c_1)}{\sum_l a_l(1 - i\omega y_l c_2)} = \left(\frac{\sum_j a_j}{\sum_l a_l}\right)\left(\frac{1 - i\omega \bar{x} c_1}{1 - i\omega \bar{y} c_2}\right)$$

$$= R\left(\frac{1 - i\omega \bar{x} c_1}{1 - i\omega \bar{y} c_2}\right)\left(\frac{1 + i\omega \bar{y} c_2}{1 + i\omega \bar{y} c_2}\right)$$

$$= R\left(\frac{1 - i\omega \bar{x} c_1 + i\omega \bar{y} c_2 + \omega^2 \bar{x} c_1 \bar{y} c_2}{1 + (\omega \bar{y} c_2)^2}\right)$$

Neglecting terms of order $\omega^2$ leaves $$G(\omega, c_1, c_2) \approx R[1 - i\omega(\bar{x}c_1 - \bar{y}c_2)] \qquad (12)$$

In other words, to first order in frequency, this function will depart from R along the imaginary axis at a rate that depends on $(\bar{x}c_1 - \bar{y}c_2)$. This gives something to fit to, but with only one degree of freedom. The best-fit values for $(\bar{x}c_1 - \bar{y}c_2)$ can be determined, but the first order function is ambiguous with regard to independent values of $c_1$ or $c_2$.

These observations suggest that one try to expand G to arbitrary orders in frequency and obtain an expression of the form $$G = \sum_{n=0}^{\infty} a_n \omega^n \qquad (13)$$

where the coefficients $a_n$ depend on the velocity constants, with $a_0 = R$ and $a_1 = -iR(\bar{x}c_1 - \bar{y}c_2)$. A power series such as this would be easier to work with than the ratio of exponentials given previously. Also, with an expression of this form, one could select an arbitrary order of accuracy, and perform a curve-fit to only those frequencies low enough to satisfy the approximation. This would ignore high-frequency information, but the highest frequencies (smallest wavelengths) will contain much of the noise anyway. In addition, lower order approximations will be less "nonlinear", roughly speaking, than higher order approximations, making it easier to locate the global minimum in the error function during the curve-fit.

To find an explicit expression for this expansion, consider the Fourier transform of an arbitrary function $a(z)$ (an array profile, for present purposes):

$$F_k[a(z)] = \int_{-\infty}^{\infty} e^{-ikz} a(z) dz \qquad (14)$$

Writing the exponential as a series expansion, which is valid for any value of the exponent, real or complex:

$$F_k[a(z)] = \int_{-\infty}^{\infty} \sum_{n=0}^{\infty} \frac{(-ikz)^n}{n!} a(z) dz \qquad (15)$$

$$= \sum_{n=0}^{\infty} \frac{(-ik)^n}{n!} \int_{-\infty}^{\infty} z^n a(z) dz$$

Suppose one divides this quantity by the integrated magnitude A of the function "a" which is the total intensity of the beam array in our case:

$$A \equiv \int_{-\infty}^{\infty} a(z) dz \qquad (16)$$

$$\frac{F_k[a(z)]}{A} = \frac{\sum_{n=0}^{\infty} \frac{(-ik)^n}{n!} \int_{-\infty}^{\infty} z^n a(z) dz}{A}$$

$$\frac{F_k[a(z)]}{A} = \sum_{n=0}^{\infty} \frac{(-ik)^n}{n!} \int_{-\infty}^{\infty} z^n \left[\frac{a(z)}{A}\right] dz$$

The quantity in brackets is a normalized function and in our case, a normalized array profile, or a fractional array intensity, with properties very similar to the probability distribution of a random variable. In particular, recalling the usual definition of the $n^{th}$ moment $\mu_{n,f}$ of a distribution $f(z)$ $$\mu_{n,f} \equiv \int_{-\infty}^{\infty} z^n f(z) dz \qquad (17)$$

the transform of the function a can be written as:

$$F_k[a(z)] = A \sum_{n=0}^{\infty} \frac{(-ik)^n}{n!} \int_{-\infty}^{\infty} z^n \left[\frac{a(z)}{A}\right] dz \qquad (18)$$

$$F_k[a(z)] = A \sum_{n=0}^{\infty} \frac{(-ik)^n}{n!} \mu_{n,a}$$

This amounts to an expression of the spectral content of the function a as an expansion in its (normalized) moments. In statistical mathematics, the expansion of the transform of a distribution $a(z)$ in terms of its moments is known as the characteristic function $\phi_a(k)$:

$$\phi_a(k) = \sum_{n=0}^{\infty} \frac{(-ik)^n}{n!} \mu_{n,a} \qquad (19)$$

Now consider the FFR of two normalized functions $a(z)$ and $b(z)$. Using the characteristic functions of a and b we can write:

$$\frac{F_k[a(z)]}{F_k[b(z)]} = \frac{\phi_a(k)}{\phi_b(k)} = \frac{\sum_{n=0}^{\infty} \frac{(-ik)^n}{n!} \mu_{n,a}}{\sum_{n=0}^{\infty} \frac{(-ik)^n}{n!} \mu_{n,b}} \qquad (20)$$

Now the transforms have been expressed as series expansions, but this doesn't help much, because they are still in a ratio. However, a ratio may be turned into a difference by taking the natural logarithm.

Consider the logarithm of a Fourier transform ratio:

$$\ln\left[\frac{F_k[a(z)]}{F_k[b(z)]}\right] = \ln\left[\frac{\phi_a(k)}{\phi_b(k)}\right] \qquad (21)$$

$$= \ln[\phi_a(k)] - \ln[\phi_b(k)]$$

$$\ln\left[\frac{F_k[a(z)]}{F_k[b(z)]}\right] = \ln\left[\sum_{n=0}^{\infty} \frac{(-ik)^n}{n!} \mu_{n,a}\right] - \ln\left[\sum_{n=0}^{\infty} \frac{(-ik)^n}{n!} \mu_{n,b}\right]$$

Replacing a ratio of sums with two logarithms of sums may not seem like much of an improvement, but the logarithms can be greatly simplified by expanding them in cumulants. The cumulants of a distribution are a type of moment. A discussion of cumulants is provided below. Again borrowing from statistical mathematics, if one uses the standard definition of the $n^{th}$ cumulant, one can write $$\ln[\phi_a] = \ln\left[\sum_{n=0}^{\infty} \frac{(-ik)^n}{n!} \mu_{n,a}\right] \equiv \sum_{n=1}^{\infty} \frac{(-ik)^n}{n!} \kappa_{n,a} \qquad (22)$$

This statement is the definition of the cumulants $K_{n,a}$ of a function a. Similarly, $$\ln[\phi_b] = \sum_{n=1}^{\infty} \frac{(-ik)^n}{n!} \kappa_{n,b}$$

Using these definitions, the logarithm of a FTR can be rewritten:

$$\ln\left[\frac{F_k[a(z)]}{F_k[b(z)]}\right] = \ln\left[\frac{\phi_a(k)}{\phi_b(k)}\right]$$

$$= \ln[\phi_a(k)] - \ln[\phi_b(k)]$$

$$= \ln\left[\sum_{n=0}^{\infty} \frac{(-ik)^n}{n!} \mu_{n,a}\right] - \ln\left[\sum_{n=0}^{\infty} \frac{(-ik)^n}{n!} \mu_{n,b}\right]$$

$$= \sum_{n=1}^{\infty} \frac{(-ik)^n}{n!} \kappa_{n,a} - \sum_{n=1}^{\infty} \frac{(-ik)^n}{n!} \kappa_{n,b}$$

$$\ln\left[\frac{F_k[a(z)]}{F_k[b(z)]}\right] = \sum_{n=1}^{\infty} \frac{(-ik)^n}{n!} (\kappa_{n,a} - \kappa_{n,b})$$

Equation 23 is an expression for the natural logarithm of an FTR as a series expansion. The natural logarithm of an FTR plays a central role in the analysis of multibeam LIDAR signals and will be designated as a "Relative Modulation Function", or RMF. Returning to the FTR of two multibeam LIDAR signals, expressed in terms of the wind speed and angle:

$$G = \frac{F_f[S_x(t)]}{F_f[S_y(t)]} = \frac{F_f[a_x(t)]}{F_f[a_y(t)]}$$

$$= R \sum_{n=0}^{\infty} \frac{\left(-2\pi i \frac{f}{V}\right)^n}{n!} \mu_{n,\chi} \bigg/ \sum_{n=0}^{\infty} \frac{\left(-2\pi i \frac{f}{V}\right)^n}{n!} \mu_{n,\gamma}$$

In this expression $\mu_{n,\chi}$ and $\mu_{n,\gamma}$ represent the (unknown) moments of the normalized, scaled arrays. Replacing these with the moments of the full arrays, $\mu_{n,x}$ and $\mu_{n,y}$, $$G = R \sum_{n=0}^{\infty} \frac{(-i\omega/V)^n}{n!} \mu_{n,x} \cos^n\theta \bigg/ \sum_{n=0}^{\infty} \frac{(-i\omega/V)^n}{n!} \mu_{n,y} \sin^n\theta$$

$$= R \sum_{n=0}^{\infty} \frac{(-i\omega c_1)^n}{n!} \mu_{n,x} \bigg/ \sum_{n=0}^{\infty} \frac{(-i\omega c_2)^n}{n!} \mu_{n,y}$$

Using the cumulants of the two (full) arrays, $$\ln\left[\frac{G}{R}\right] = \sum_{n=1}^{\infty} \frac{(-i\omega)^n}{n!} (c_1^n \kappa_{n,x} - c_2^n \kappa_{n,y})$$

or, defining a new function, the natural logarithm of the normalized FTR of the multibeam LIDAR signals, $$g(\omega, c_1, c_2) \equiv \ln\left[\frac{G}{R}\right] = \sum_{n=1}^{\infty} \frac{1}{n!} (-i\omega)^n (c_1^n \kappa_{n,x} - c_2^n \kappa_{n,y}) \quad 24$$

To Nth order one can write, $$g_N(\omega, c_1, c_2) = \sum_{n=1}^{N} \frac{(-i\omega)^n}{n!} (c_1^n \kappa_{n,x} - c_2^n \kappa_{n,y}) \quad 25$$

Equation 25 may be considered the central element of multibeam LIDAR signal analysis. It relates the RMF of the signals, g, to the wind speed and angle (through the constants $c_1$ and $c_2$). It is an expression for the RMF as a power series, valid to arbitrary order, which is easily implemented on a computer. Furthermore, there are no cross-terms in $c_1$ and $c_2$, which will simplify curve-fitting procedures.

All that remains is to calculate the cumulants of the two arrays $K_{n,x}$ and $K_{n,y}$.

As shown in the below discussion of cumulants, the cumulants can be calculated as functions of the moments, and as defined in this section, the moments are properties of a continuous distribution. Note that if the previous expression for array intensity profiles as a superposition of beam profiles f(x) is used, one obtains an expression of the form $$\mu_{n,x} \equiv \int_{-\infty}^{\infty} x^n \left|\sum_j a_j f(x - x_j)\right| dx$$

$$= \sum_j \left[a_j \int_{-\infty}^{\infty} x^n f(x - x_j) dx\right]$$

In the limit of extremely sharp, narrow beams, f becomes a Dirac delta function, and the (normalized) moments become $$\mu_{n,x} \equiv \frac{\sum_j a_j x_j^n}{\sum_j a_j} \quad 26$$

Notice that the first order moment thus calculated corresponds exactly to the expression for the mean beam position used earlier in the derivation of the first order expansions of G. Also note that calculation of the cumulants to high orders is extremely laborious, but this can always be carried out beforehand and the results saved in a calibration file.

Similar to a correlation, the ratio of Fourier transforms, and its logarithm, amount to a comparison between two time signals. Unlike a correlation, however, these functions comprise a frequency-by-frequency comparison of each amplitude and phase. The value of a Fourier transform at each frequency is a complex number, which may be written $\alpha e^{i\phi}$, representing the amplitude and phase of the component sine wave of the transformed signal at that frequency. Thus, the ratio of two Fourier transforms is the ratio of two complex numbers, each with an amplitude $\alpha$ and a phase $\phi$:

$$\frac{\alpha_1 e^{i\phi_1}}{\alpha_2 e^{i\phi_2}} = \frac{\alpha_1}{\alpha_2} e^{i(\phi_1 - \phi_2)} \quad 27$$

In other words, the FTR of two signals at each frequency is a complex number having an amplitude equal to the ratio of amplitudes of the signals at that frequency, and a phase equal to the difference in phases of each signal's component wave at that frequency. Furthermore, the logarithm of the FTR, the RMF, will be $$\ln\left[\frac{\alpha_1}{\alpha_2}e^{i(\phi_1-\phi_2)}\right] = \ln\left[\frac{\alpha_1}{\alpha_2}\right] + i(\phi_1 - \phi_2) \qquad 28$$

This follows the general rule that the natural logarithm of a complex number equals the natural logarithm of its amplitude plus i multiplied by the phase. In essence, the logarithm converts the amplitude and phase into real and imaginary components. The FTR and the RMF serve as comparisons of two functions in the following manner: For any given frequency, when the first signal (the one placed in the numerator) has a stronger component at that frequency than the second signal, the FTR has a magnitude greater than one, while the RMF has a positive real component. In the reverse situation, the FTR has a magnitude less than one, and the RMF has a negative real component. When the first signal leads the second (at the frequency in question), its phase will be advanced relative to the second, the FTR will have a phase greater than one (on a scale of $-\pi$ to $+\pi$), and the RMF has a positive imaginary component. If the first signal lags the second, the FTR has a phase less than one and the RMF has a negative imaginary component.

While ratios of Fourier transforms are sometimes used for deconvolution in various applications (e.g. image processing), the interpretation of an FTR and its logarithm as indicating relative amplitude and phase, and their use in comparing two signals, appear to be entirely new. No references to this type of analytic technique have yet been found in the literature, although it would seem to be quite useful in certain applications.

The ratio of Fourier transforms of two multibeam LIDAR signals will be a unique function of wind velocity and angle. Furthermore, a power series expansion for the natural logarithm of this function (the RMF) is available, making computations somewhat easier. Thus, an outline of the procedure for determining wind velocity may be stated as follows: Generate LIDAR signals from two orthogonal beam arrays, transform the signal from each of the arrays, take the logarithm of the ratio of the transforms, and fit the resulting data to the power series expression for $g_N$. Low order approximations may use only those frequencies low enough to satisfy the approximation, but the higher frequencies will contain most of the noise anyway. Furthermore, higher order approximations will be increasingly nonlinear, making the curve-fitting process more difficult.

Conventional correlation LIDAR devices compare signals at different places and times through the use of correlation functions. (Fourier transforms are often involved, but only as a way of calculating the correlation function—the transform of the correlation of two signals equals the transform of one signal multiplied by the complex conjugate of the transform of the other.) As has already been mentioned, this type of analysis retains the particulate distribution information, which may be important if one is interested in calculating turbulence parameters, but only serves to confuse velocity calculations. It may be said that the RMF makes better use of the information, in that it eliminates the underlying distribution information from the analysis, and allows separate analysis at various wavelengths, which may be important if high frequency noise is present. The RMF may be applied to conventional correlation data as well as multibeam LIDAR data, providing a simpler and more elegant method of determining the time lag, rather than applying some kind of peak-finding method to a correlation function. Consider two identical signals offset by a certain amount of time. According to the time-shifting theorem, the Fourier transform of one will equal the transform of the other multiplied by a phase factor:

$$F[S(t+\Delta t)] = e^{-i\omega\Delta t}F[S(t)] \qquad 29$$

Thus, $$\frac{F[S(t+\Delta t)]}{F[S(t)]} = e^{-i\omega\Delta t} \qquad 30$$

$$\ln\left[\frac{F[S(t+\Delta t)]}{F[S(t)]}\right] = -i\omega\Delta t$$

$$\frac{i}{\omega}\ln\left[\frac{F[S(t+\Delta t)]}{F[S(t)]}\right] = \Delta t$$

In this instance, the RMF is simply proportional to frequency, with (i multiplied by) the time lag as the proportionality constant. The "curve fit" in this case simply amounts to multiplying all data points by $i/\omega$ and taking the average. Thus using the RMF, we have a simple way of comparing two signals to determine the time lag, without resorting to lengthy correlation analysis. The same basic procedure can be perhaps applied in two dimensions as well, providing a simple and elegant method of calculating spatial lags for various types of image correlation analysis, such as that in Particle Image Velocimetry.

In one aspect, the invented method of determining the wind velocity includes curve fitting the logarithm of the ratio of Fourier transforms of the signals from two orthogonal beam arrays. It may be worth exploring in a little more detail just what this means physically.

As with all correlation methods, the RMF method is at root an attempt to "track" the motion of large structures by comparing information obtained from different points in space. Conventional correlation methods carry out this comparison by means of the correlation function. Structures will appear at one location some time before or after they appear at another, and this temporal displacement will ideally be indicated by a sharp peak in the correlation function. In contrast, the RMF method collects information from several locations simultaneously, and compares patterns in the observed data to determine the scales of those patterns, by means of the RMF. The principal advantages of the RMF method are that it enables the full horizontal velocity vector as a function of altitude to be calculated from two signals in one step, by means of a relatively straightforward curve-fitting procedure.

As with other correlation methods, the RMF method depends upon large-scale particulate structures and the assumption of frozen turbulence, or in other words, the frozen one-dimensional model upon which the RMF method was derived. Simply put, if the motion of structures is to be tracked successfully, the same structures must cross all observation points without advancing, falling behind, or otherwise evolving. If this is the case, then the similarities between the signals received from various points in space indicate the particulate distribution, and the differences are (ideally) due solely to the locations of the observation points and the motion of the structures. In mathematical terms, the differences are temporal offsets—and temporal offsets only. Any other differences between locations, such as those caused by smaller scale structures passing through some locations and not others, or passing only partially through some locations, or evolving between locations, are due to unaccountable sources, and corrupt the analysis. Thus the more medium and small scale structures (of the order of the sampling volume and smaller) dominate over large scale fluctuations, the more noise will be contained in either the correlation function or the RMF and the poorer the results. The more large-scale fluctuations dominate over small, the cleaner will be the comparison functions and the better the results.

The RMF method tracks structures by observing the patterns they induce in the signals as they travel through the arrays. The faster the structures travel and the more oblique their angle with respect to the array, the faster will be the patterns they induce. The slower the structures travel, and the more their motion is aligned along the array, the slower will be the induced patterns. (Notice that the scaling parameter $c_1$ in our multibeam signal transforms, equal to $\cos(\theta)/V$, is the reciprocal of the apparent structure propagation velocity along the X-array. Similarly, $c_2$ is the reciprocal of the apparent propagation velocity along the Y-array.) The patterns will be backwards if the structures move backwards through the arrays. (Note that the scaling constants may be positive or negative.) Thus, the relative scale of the patterns in the two signals (the duration in time) reveals the orientation of the wind, while the joint scale of the pair reveals the wind velocity.

The incident particulate distribution may be considered as a superposed set of "carrier waves" passing over the array, and the arrays as "modulators". (Strictly speaking, the particulate distribution would have to be a set of plane waves, since any curvature to the wave fronts would violate the one-dimensional model and degrade the correlation between beams.) In this view, the Fourier transforms serve to decompose the particulate distribution into its set of component waves, and the RMF compares the array-induced modulation at each frequency to determine which array has the larger magnitude, and which array leads the other.

Consider the time signal produced by a hypothetical single LIDAR beam placed at the intersection of the two arrays, which we may take to be our origin, as representing the raw, unmodulated particulate distribution. How will passage of the particulate structures through the (scaled) arrays modulate the signal? The first moment of a beam array represents its mean beam position. If an array had a first moment only (e.g. if it were a single thin beam offset from the origin), the effect of the array would be to displace the signal in time by the amount required for structures to pass between the origin and the (apparent) mean array position. If the offsets due to the two arrays differ, the difference will be revealed in the RMF. If the particulate structures reach the X-array's mean position first then the X-array's signal will tend to lead the Y-array's signal at each frequency, and the RMF will tend to have a positive imaginary component, and vice versa. Thus, the effect of the array's first moments will be to offset their corresponding signals by different time lags, depending on each array's (apparent) mean distance from the origin.

The second (central) moment of an array equals the variance in its beam positions, and is a measure of its width. The effect of the second moment will be to convolve, or smear, the respective signal by an amount depending on the apparent array width. (One may imagine a Gaussian array profile here, as Gaussian functions have first and second moments only.) Thus, the two signals will be smeared by different amounts depending on each array's apparent width. If the particulate structures travel along the X-array and normal to the Y-array, then the X-array's signal will be smeared by a greater amount than the Y-array's signal, thus amplifying the larger wavelengths in the X-array's signal, meaning that the RMF will tend to have a positive real value at large wavelengths (low frequencies). In a similar manner, the effect of the third moments (the "skewness") will be to "skew" their respective signals one way or the other, tending to make a signal appear forward or backward shifted, the effect of the fourth moments (the "kurtosis", or "peakiness") will be to make the signals "peaky", affecting how "smeared" they appear and how strong the amplitudes are at various frequencies, and so forth. At every frequency, the arrays will tend to shift the underlying "carrier wave" forward or backward in time, contributing to the imaginary component of the RMF, and to amplify or attenuate it, contributing to the real component. (As an interesting side note, one may observe that it is the array's odd moments which do the phase shifting, thus contributing to the imaginary component of the RMF, and the even moments which do the amplifying, thus contributing to the real component of the RMF.) In this way, the sign and magnitude of the real and imaginary components of the RMF at each frequency reveal the relative modulation of the two signals at that frequency. This is the reason for designating it as the "relative modulation function." Now, another question worth answering is: How will the RMF vary with frequency? For frequencies near zero (very large wavelengths), the two signals will appear virtually the same, there will be little modulation, the FTR will be close to one, and the RMF will be close to zero. At slightly higher frequencies and slightly lower wavelengths, the modulations become greater, the first term in the expansion (involving the first moment) takes effect, and the RMF departs from zero along the imaginary axis. As wavelengths decrease, smaller variations in the array profile become important, higher moments come into effect, higher terms in the expansion become important, and the RMF curves in various directions. Thus, with frequencies increasing from zero, the RMF starts at the origin, travels vertically away from the origin, and loops around in the complex plane. Note that if velocities are very low, the discrete RMF—formed from discrete Fourier transforms—may not appear continuous, as the higher moments will be important even at the lowest resolved frequencies, and the frequency resolution will span one or more "loops", making the data points seem to jump around arbitrarily in the complex plane. Also note that some software packages "wrap" phase angles when they exceed $\pm\pi$, so that in practice the data may exhibit jumps of $2\pi$ without actually being discontinuous.

As mentioned earlier, multi-dimensional structure in the particulate distribution results in location-to-location deviations in the observed structure, and degrades the correlation between signals. Furthermore, various experimental factors cause fluctuations in the signal that are not due to the array modulation. One such factor is pulse-to-pulse fluctuations in the laser's output. Fortunately, much of this effect can be corrected through the use of pulse monitoring sensors. Another experimental problem occurs when the scattering signal is strong enough to overload the photodetector. Such overloading does not damage the detector—it merely causes it to continuously produce its maximum output, hiding any fluctuations above that level.

In terms of the RMF, these undesirable signal fluctuations (or lack thereof) will appear as differing amplitudes and phases at each frequency, or in other words, differing modulations. Since these modulations will be essentially random, the RMF will thus exhibit data-point scattering about the ideal, smooth function representing the array-induced modulations.

If the LIDAR signal is dominated by large trends, due to large-scale structures, rather than small-scale fluctuations, the small-scale fluctuations will have relatively little power, and the noise will be relatively unimportant. However, as the strength of the large-scale structures diminishes, i.e. as the particulate distribution becomes more homogeneous, the noise becomes more influential, the RMF becomes more erratic, and curve-fitting of the RMF becomes less reliable.

Similar problems occur in power spectrum analysis, and are often dealt with by subdividing a signal into many intervals, and averaging together the transforms of the intervals, rather than using a single transform of the entire signal. A similar approach may be used here. More specifically, consider the Fourier transform ratio:

$$\frac{F[S_1(t)]}{F[S_2(t)]} = \frac{\alpha_1(\omega)e^{i\phi_1(\omega)}}{\alpha_2(\omega)e^{i\phi_2(\omega)}} = \frac{\alpha_1(\omega)}{\alpha_2(\omega)}e^{i(\phi_1(\omega)-\phi_2(\omega))} \quad 31$$

In the case of multibeam LIDAR signals, the relative modulation factor $$\frac{\alpha_1}{\alpha_2}e^{i(\phi_1-\phi_2)}$$

reflects the effects of the arrays and contains the useful information. For simplicity, let's denote it by $\sigma e^{i\delta}$. Since the influence of the undesirable contributions to signal fluctuations cannot in general be quantified, their effects are unknown and constitute unwanted noise. Let's denote their effects by an additional modulation factor for each frequency: $ve^{i\psi}$. This factor will equal one ideally, but in practice will represent the relative amplitude and phase shifts caused by the noise in the two signals. With this terminology, the FTR of real signals may now be represented as $\sigma e^{i\delta}ve^{i\psi}$.

There seems to be no reason to suppose that the noise factor $ve^{i\psi}$ would not be approximately one in the mean. In other words, the noise will be equally likely to amplify the wave as attenuate it, and equally likely to phase shift it one way, as to shift it the other. If this is the case, the product of many magnifications or reductions will tend towards one, the sum of many random phase offsets will tend towards zero, and thus the product of many noise factors will tend towards one. Thus if one calculates FTR functions of the signals over N intervals, one obtains a group of N factors:

$$\sigma e^{i\delta}v_1e^{i\psi_1}, \sigma e^{i\delta}v_2e^{i\psi_2}, \text{etc.}$$

Multiplying all of these together, taking the logarithm, and dividing by N, $$\frac{1}{N}\ln\left[\prod_{n=1}^{N}\sigma e^{i\delta}v_ne^{i\psi_n}\right] = \frac{1}{N}\ln\left[(\sigma e^{i\delta})^N\prod_{n=1}^{N}v_ne^{i\psi_n}\right] \quad 32$$

$$\frac{1}{N}\ln\left[\prod_{n=1}^{N}\sigma e^{i\delta}v_ne^{i\psi_n}\right] = \ln(\sigma e^{i\delta}) + \frac{1}{N}\sum_{n=1}^{N}v_ne^{i\psi_n}$$

The first term on the right is the ideal RMF, while the second term on the right represents the averaged noise. With sufficient values of N, the noise should diminish to acceptable levels, and one will be left with the ideal RMF.

Finally, since the RMF should be a smooth function of frequency, while the noise is theoretically random, one may suppose that smoothing of the data would help to produce better RMF functions from the data. In practice, however, smoothing over only a few data points does not affect the large scale trends which are being sought by the curve-fitting routine, while smoothing over many data points, in addition to requiring large amounts of computing time, results in distortions and a tendency of the RMF to shrink towards the origin in the complex plane, resulting in artificially large apparent velocities.

The signal generated by a certain array will depend on the intensity and distribution of the laser beams, and the distribution of particulates in the air. The spectral content of the signal, as given by a Fourier transform, will therefore contain components due to the spectral content of the array, and the spectral content of the particulate distribution. Consider again the ratio of Fourier transforms:

$$\frac{F_f[S_x(t)]}{F_f[S_y(t)]} = \quad 36$$

$$\frac{\frac{1}{V}F_f[a_x(z)]F_f[D_o(-u)]}{\frac{1}{V}F_f[a_y(z)]F_f[D_o(-u)]} = \frac{F_f[a_x(z)]F_f[D_o(-u)]}{F_f[a_y(z)]F_f[D_o(-u)]} = \frac{F_f[a_x(z)]}{F_f[a_y(z)]}$$

One useful property of this ratio is that the dependence on the unknown particulate distribution disappears, leaving only the dependence on the arrays. On the other hand, homogeneous particulate distributions obviously cannot produce useful patterns in the signal, so there must be some dependence on the distribution. These observations can be reconciled by noting that if the particulate distribution contains little spectral content at the interesting frequencies, the multibeam FTR will consist of the ratio of array transforms multiplied in the numerator and denominator by a small number, making the calculations susceptible to small errors in this number. In the extreme case of no spectral content (e.g. no dust or perfectly uniform dust distribution), both transforms will be zero everywhere, and the ratio will be undefined. Thus, the particulate distribution can be arbitrary, with the following stipulation: it must have some significant spectral content at the interesting wavelengths. Furthermore, the larger the spectral content of the distribution, the less susceptible the calculations will be to noise. Thus clean air and homogeneous air will give noisy transform ratios and poor results, as one would expect.

Information from wavelengths close to the array size and smaller is polluted by noise, and is generally unusable, so that the RMF method depends on wavelengths significantly larger than the array size. In practice, array sizes will vary with altitude and will range from approximately one meter to roughly ten. Thus fluctuations must exist in the particulate distribution on scales of roughly 50 meters and larger.

One of the underlying assumptions in the one-dimensional model of the multibeam LIDAR signals is that the motion is purely horizontal. In actuality, some vertical motion will usually exist, but as long as vertical motion is not strong enough to carry structures through one vertical sampling interval (about 3 meters) in the duration of one array transit (roughly 1 second, depending on velocity and altitude), the horizontal velocity measurements should not be affected. If this is not the case, additional averaging—possibly covering data from several altitudes—may be required to reduce the additional noise, or the measurements may become completely invalid. It may be possible to measure the vertical component of motion as well, using correlations between altitudes.

Regarding the specific form that the beam arrays may take, it should be noted that acceptable beam distributions are not in general arbitrary. For example, if one of the arrays is symmetric it will produce the same patterns in the signal whether the particulate structures are moving forward or backward along the array. More precisely, the signals will be ambiguous with regard to a reflection of the velocity vector about a line normal to the array. This appears in the mathematics through the fact that all odd (central) moments of symmetric distributions are zero, meaning that only even powers of the corresponding velocity constant are left in the RMF. (It may be shown that if all odd moments vanish, so do all odd cumulants.) Note that the expression for the RMF of a multibeam LIDAR, as shown below, is ambiguous with regard to a sign change in $c_1$ or $c_2$ whenever all corresponding odd cumulants vanish.

$$g(\omega, c_1, c_2) = \ln\left[\frac{G}{R}\right] = \sum_{n=1}^{\infty} \frac{(i\omega)^n}{n!}(c_1^n \kappa_{n,x} - c_2^n \kappa_{n,y}) \quad 33$$

Another ambiguity occurs if the two arrays are identical. In this case, the RMF will be ambiguous with regard to the velocity whenever the velocity falls along the bisector of the angle between the two arrays. The reason is that when particulate structures cross two identical arrays at the same angle, the two arrays will produce identical signals, and the RMF will equal zero at all frequencies. Mathematically, when the arrays are identical, they will have identical cumulants, and the RMF becomes $$g(\omega, c_1, c_2) = \sum_{n=1}^{\infty} \frac{(-i\omega)^n}{n!}(c_1^n \kappa_{n,x} - c_2^n \kappa_{n,y})$$

$$= \sum_{n=1}^{\infty} \frac{(-i\omega)^n}{n!} \kappa_n (c_1^n - c_2^n)$$

$$= \sum_{n=1}^{\infty} \frac{(-i\omega)^n}{n!} \frac{\kappa_n}{V^n} (\cos^n\theta - \sin^n\theta)$$

This expression becomes zero for angles of $\pi/2$ and $3\pi/2$, and under these circumstances is independent of the velocity.

Finally, one may suppose that larger arrays would in general be more able to discriminate differences in particulate structure at different locations. Extremely small arrays, after all, would be little different from single beams. Mathematically, larger arrays will have larger moments and create larger RMF functions. In addition, larger arrays will allow lasers pulsing at a limited rate to resolve fluctuations in the signals caused by structures passing through the arrays. On the other hand, larger arrays will also introduce larger errors due to the multi-dimensional nature of the particulate structures. Furthermore, larger moments cause higher order terms in the RMF to be important, decreasing the accuracy of a low-order truncation. (In practice, the array size at all altitudes is also limited by the field of view of the receiving telescope.) Thus, a happy medium must be found for the array sizes, depending largely on the field of view of the telescope, the data sampling rate, and the expected wind velocities at all altitudes.

In practice, one will not deal with infinite, continuous signals and analytic transforms, but finite, discretely sampled data and discrete Fourier transforms, and the sampling rate and sampling duration will place lower and upper limits on the time scale of resolvable variations. Since the RMF method depends in part upon identifying phase shifts due to temporal offsets between beams, it will be desirable to sample faster than a typical beam-to-beam structure transit time in order to resolve the structure in transit. Conversely, since the sampling rate is fixed by the pulse rate of the laser, it will be desirable to have arrays large enough so that a typical beam-to-beam transit time is longer than the sampling interval. For example, if the pulse rate of the laser is 50 Hz then the maximum expected wind velocity at some altitude is 20 meters per second, and three samples per beam-to-beam transit can be chosen as a minimum value, this means that the beams will have to be 20×3/50=1.2 meters apart at that altitude.

Furthermore, since the RMF method depends on a curve-fit to a truncated power series in frequency, and will be valid only for frequencies below a certain value, or periods above a certain value, it will be necessary to sample data for a long enough time to provide an adequate number of large periods (low frequencies) in the RMF over which to fit the data. This consideration raises two questions: What is the acceptable frequency range, and how long must one sample to obtain a sufficient number for frequency points in this range?

For purposes of analysis, if one takes the constant c to be the reciprocal of the wind velocity, and the width $\sigma$ of an array as a measure of its moments, then the terms in the RMF go roughly as powers of $\omega c \sigma$, which is a non-dimensional ratio of the array transit time to the period in question. The $n^{th}$ term in the power series will become important as $(\omega c \sigma)^n$ approaches unity. Thus when performing a fit to a truncated series, one will have to ignore all frequencies on the order of $V/\sigma$, or one over the array transit time, and higher. A more precise cutoff value may be estimated if desired by selecting an order n, selecting some cutoff value for $(\omega c \sigma)^n$, estimating a minimum wind speed, and solving for $\omega$.

Now, in order to obtain a sufficient number of frequency points in the transform below this cutoff value, one must perform the transform on a sufficiently long time interval. The frequency values $f_i$ of a discrete Fourier transform are integer multiples of one over the sampling duration T, or $$f_i = \frac{(i-1)}{T} = \frac{(i-1)}{N \Delta t}, \quad 1 \leq i \leq N/2$$

where N is the number of sampling points and $\Delta t$ is the sampling interval. This means that if n nonzero frequency points are desired, then $$T = \frac{n}{f_n} = nP_n$$

where $P_n$ represents the period corresponding to the cutoff frequency. In other words, if one desires 20 frequency points for the curve-fit, one must perform transforms on intervals 20 times the cutoff period. In practice the total sampling time will be even larger than this, due to the need to average transforms over many intervals. For example, if a typical array transit time is one second, and three seconds is chosen as the minimum acceptable period, then the transform can be over an interval 60 seconds or larger.

The multibeam LIDAR produces streams of data from the two arrays. After selecting an altitude and time interval in which to calculate the wind velocity, the data analysis begins with two time series, one from each array, of equal length and beginning at the same time. In mathematical terms, one has:

$$S_x(t_i)$$
$$1 \leq i \leq N$$
$$S_y(t_i)$$

Before calculating the Fourier transforms of these signals, some preprocessing is desirable. First of all, LIDAR data occasionally contains "dropouts," due to lapses in the laser output or to data triggering flaws, and "spikes," due to birds or insects crossing the laser beams. These blemishes have an adverse effect on the RMF, but they can often be removed in a straightforward manner by replacing every data point above or below a certain threshold with the average of its neighbors.

Also, as with any Fourier transform of a finite duration signal, the data series must be multiplied by an appropriate 'tapering function', which tapers the data towards zero near the ends of the series. If this is not done, the ripples associated with transforming a "top hat" function (a finite duration signal may be viewed as an infinite function multiplied by a top hat function) will grossly distort the transforms and the RMF. The tapering function effectively throws away some of the information near the ends of the interval, but this information may be recovered by averaging transforms of overlapping intervals.

On the other hand, in contrast to conventional spectral analysis in which the subtraction of a trend is often desirable, it will be counterproductive here, since in practice slightly different trends would be subtracted from the numerator and denominator, thus disturbing the relative modulation. However, unlike ordinary power spectra, the trends do not obscure the interesting information here, since they cancel out in the ratio anyway.

After preprocessing, the next step is to calculate the transforms. The standard Fast Fourier Transform of one time series produces a complex data series, of the same length, with the negative frequency portion of the spectrum mapped onto the second half of the series. Thus after taking the FFT of the two time series, one has two data series in frequency, of length N:

$$F_{fi}[S_x(t_i)] \atop F_{fi}[S_y(t_i)]} 1 \le i \le N, f_i = \begin{cases} \frac{(i-1)}{N\Delta t}, & i \le N/2 \\ \frac{-(N-(i-1))}{N\Delta t}, & i \ge N/2+1 \end{cases}$$

Since the Fourier transforms of real functions are antisymmetric, the second half is redundant, and may be discarded. Furthermore, only low frequencies for which the truncated power series expansion of the RMF is applicable will be used in the curve-fit, so an appropriate frequency cutoff value $\omega_m$ must be chosen, resulting in two truncated data series of length m. The ratio of the two transforms will be a series of the same length, corresponding to the same frequencies.

$$\frac{F_{fi}[S_x]}{F_{fi}[S_y]} \; 1 \le i \le m, f_i = \frac{(i-1)}{N\Delta t}.$$

After calculating the FTR, the next step is to normalize the function by dividing by the ratio of array strengths R. Rather than using a pre-measured array-strength calibration value, however, one can simply use the value of the data point at zero frequency. The first data point of a Discrete Fourier Transform is simply the sum of all time values, which for a LIDAR should be an indication of the strength of the laser, and be immune to noise. Normalizing by the ratio of these values has the advantage that the power level of each laser can be adjusted independently and arbitrarily, with no need to adjust the calculations after changes in laser setting, or as the laser changes in temperature or age. Thus, after taking the natural logarithm, one obtains a single data series in frequency, of length m, with frequencies corresponding to those of the Fourier transform:

$$g_i = \ln\left[\frac{F_{fi}[S_x]}{F_{fi}[S_y]} \Big/ \frac{F_{fl}[S_x]}{F_{fl}[S_y]}\right] \; 2 \le i \le m, \omega_i = 2\pi \frac{(i-1)}{N\Delta t}$$

At this point, assuming one wishes to reduce noise by averaging RMF data over many time intervals, one must go back to the beginning and start over with another time interval. The data for $g_i$ thus obtained will then be added to a cumulative sum, and the process repeated as often as desired.

The final step in the analysis is to perform a curve-fit to determine the velocity constants. The method used to generate the results presented in this work was a straightforward Newton-Raphson routine, based on a fourth-order series expansion of the RMF.

The data analysis procedure can include selecting two long data series of equal length, subdividing into several intervals, multiplying each by a suitable tapering function, taking the average of the natural logarithm of the ratio of the Fourier transforms for each interval, performing a nonlinear regression of the resulting function for $c_1$ and $c_2$, and finally solving $c_1$ and $c_2$ for the wind velocity and angle.

With regard to cumulants, for a random variable which takes on values x, with a probability distribution f(x) having moments $\mu_n$, the characteristic function of f is defined as $$\phi(k) = F_k[f(x)] = \int_{-\infty}^{\infty} e^{-ikx} f(x) dx$$
$$= \sum_{n=0}^{\infty} \frac{(-ik)^n}{n!} \int_{-\infty}^{\infty} x^n f(x) dx$$
$$= \sum_{n=0}^{\infty} \frac{(-ik)^n}{n!} \mu_n$$

The characteristic function for the cumulants $\phi_c$ and the $n^{th}$ cumulant $K_n$ are defined by $$\phi_c(k) = \ln[\phi(k)]$$

$$\sum_{n=1}^{\infty} \frac{(-ik)^n}{n!} \kappa_n \equiv \ln\left[\sum_{n=0}^{\infty} \frac{(-ik)^n}{n!} \mu_n\right]$$

This can be rearranged, $$\ln\left[1 + \sum_{n=1}^{\infty} \frac{(-ik)^n}{n!} \mu_n\right] = \sum_{n=1}^{\infty} \frac{(-ik)^n}{n!} \kappa_n$$

Using the Maclaurin series expansion for ln(1+x), one can write $$\left[\sum_{n=1}^{\infty} \frac{(-ik)^n}{n!} \mu_n\right] - \frac{1}{2}\left[\sum_{n=1}^{\infty} \frac{(-ik)^n}{n!} \mu_n\right]^2 + \ldots = \sum_{n=1}^{\infty} \frac{(-ik)^n}{n!} \kappa_n$$

The cumulants on the right can be determined as functions of the moments on the left by matching coefficients on powers of k. For each power on the right, there will be one term contributed by the series on the left with the corresponding power (with n=1), and cross terms from all series raised to lower powers. Thus, $\kappa_1 = \mu_1 =$ mean $\kappa_2 = \mu_2 - \mu_1^2 =$ variance $$\kappa_3 = \mu_3 - 3\mu_2\mu_1 + 2\mu_1^2$$

$$\kappa_4 = \mu_4 - 4\mu_3\mu_1 - 3\mu_2^2 + 12\mu_1^2\mu_2 - 6\mu_1^4$$

etc.

The cumulants are also related to the central moments defined by $$v_1 = \mu_1 = \text{mean}$$

$$v_2 = \overline{(x-\mu_1)^2} = \sigma^2 = \text{variance}$$

$$v_3 = \overline{(x-\mu_1)^3}$$

$$v_4 = \overline{(x-\mu_1)^4}$$

etc.

where the overbar denoted an integral over x of the indicated quantity multiplied by the probability distribution f(x), or in other words, an average. The relationship between the cumulants and the central moments can be shown to be as follows:

$$\kappa_1 = v_1$$

$$\kappa_2 = v_2$$

$$\kappa_3 = v_3$$

$$\kappa_4 = v_4 - 3v_2^2$$

$$\kappa_5 = v_5 - 10v_2v_3$$

etc.

It will be apparent to those skilled in the art that various modifications and variations can be made in the present invention without departing from the scope or spirit of the invention. Other embodiments of the invention will be apparent to those skilled in the art as a result of consideration of the specification and practice of the invention disclosed herein. It is intended that the specification and examples be considered as exemplary only, with the true scope and spirit of the invention being indicated by the following claims.

What is claimed is:

1. A system for measuring a first axis projection and a second axis projection of a velocity of a distribution of particulate matter, the system comprising:
    at least three first light emitters disposed along the first axis at irregular distances from one another and aimed substantially perpendicular to the first axis for aiming at and illuminating the distribution to cause a first light signal to be reflected from the distribution;
    at least three second light emitters disposed along the second axis at irregular distances from one another and aimed substantially perpendicular to the second axis for aiming at and illuminating the distribution to cause a second light signal to be reflected from the distribution;
    a detector for receiving the first light signal to produce a first detector signal and for receiving the second light signal to produce a second detector signal;
    a controller coupled to the first light emitters, the second light emitters, and the detector, the controller programmed or adapted to calculate the first axis projection and the second axis projection of the velocity of the distribution in response to the first and second detector signals.

2. The system claimed in claim 1, wherein the controller alternately activates the first and second light emitters.

3. The system claimed in claim 1, wherein the first axis is substantially perpendicular to the second axis.

4. The system claimed in claim 1, wherein the irregular distances of the first light emitters are different from the irregular distances of the second light emitters.

5. The system claimed in claim 1, wherein the first light emitters are divergently aimed to illuminate the distribution.

6. The system claimed in claim 1, wherein the detector comprises a telescope oriented to collect at least the first light signal and a photomultiplier optically coupled to the telescope.

7. The system claimed in claim 1, wherein the first axis crosses the second axis at a position between two of the first light emitters and between two of the second light emitters.

8. The system claimed in claim 1, the controller comprising a data storage device for storing data representing the first detector signal and the second detector signal.

9. The system claimed in claim 1, further comprising a first light source optically coupled to each of the first light emitters, wherein at least one of the first light emitters comprises a beam splitter.

10. The system claimed in claim 9, wherein the first light source comprises a first laser.

11. The system claimed in claim 9, further comprising a second laser optically coupled to each of the second light emitters, wherein at least one of the second light emitters comprises a beam splitter.

12. A system for measuring the projection of a velocity of a distribution of particulate matter along an axis, the system comprising:
    at least three first light emitters disposed along the axis at irregular distances from one another and aimed substantially perpendicular to the axis for aiming at and illuminating the distribution to cause a light signal to be reflected from the distribution;
    a detector for receiving the light signal to produce a detector signal;
    a controller coupled to light emitters and to the detector, the controller programmed or adapted to calculate the projection of the velocity of the distribution along the axis in response to the detector signal.

13. The system claimed in claim 12, wherein the light emitters are divergently aimed to illuminate the distribution.

14. The system claimed in claim 12, wherein the detector comprises a telescope oriented to collect at least the light signal and a photomultiplier optically coupled to the telescope.

15. The system claimed in claim 12, wherein the controller comprises a data storage device for storing data representing the first detector signal.

16. The system claimed in claim 12, further comprising a light source optically coupled to each of the light emitters, and wherein at least one of the light emitters comprises a beam splitter.

17. The system claimed in claim 16, wherein the light source comprises a laser.

18. A system for measuring a first axis projection and a second axis projection of a velocity of a distribution of particulate matter, the system comprising:
    means for illuminating the distribution with first send pulses, each first send pulse comprising at least three first light beams disposed along the first axis at irregular distances from one another and aimed substantially perpendicular to the first axis for aiming at and illuminating the distribution to cause a first light signal to be reflected from the distribution;
    means for illuminating the distribution with second send pulses, each second send pulse comprising at least three second light beams disposed along the second axis at irregular distances from one another and aimed substantially perpendicular to the second axis for aiming at and illuminating the distribution to cause a second light signal to be reflected from the distribution;

means for detecting the first light signal and producing a first detected signal and means for detecting the second light signal and producing a second detected signal;

means for calculating the first axis projection and the second axis projection of the velocity of the distribution in response to the first and second detected signals.

19. The system claimed in claim 18, further comprising means for alternately activating the first and second send pulses.

20. The system claimed in claim 18, wherein the first axis is substantially perpendicular to the second axis.

21. The system claimed in claim 18, wherein the irregular distances of the first light beams are different from the irregular distances of the second light beams.

22. The system claimed in claim 18, wherein the first light beams are divergently aimed to illuminate the distribution.

23. The system claimed in claim 18, wherein the means for detecting the first light signal and producing the first detected signal comprises a first telescope oriented to collect at least the first light signal and a first photomultiplier optically coupled to the first telescope.

24. The system claimed in claim 23, wherein the means for detecting the second light signal and producing the second detected signal comprises the first telescope and the first photomultiplier.

25. The system claimed in claim 18, wherein the first axis crosses the second axis at a position between two of the first light beams and between two of the second light beams.

26. The system claimed in claim 18, further comprising data storage means for storing data representing the first detected signal and the second detected signal.

27. The system claimed in claim 18, wherein the means for illuminating the distribution with first send pulses comprises a first laser.

28. The system claimed in claim 27, wherein the means for illuminating the distribution with first send pulses comprises a beam splitter.

29. The system claimed in claim 27, wherein the means for illuminating the distribution with second send pulses comprises the first laser.

30. A method of measuring a first axis projection and a second axis projection of a velocity of a distribution of particulate matter, the method comprising the steps of:

a) repeatedly generating first send pulses, each first send pulse comprising at least three first light beams disposed along the first axis at irregular distances from one another, the first light beams substantially perpendicular to the first axis and aimed at the distribution to repeatedly cause first return pulses to be reflected from the distribution, each first return pulse corresponding to a particular first send pulse;

b) repeatedly receiving the first return pulses with a detector and repeatedly producing first detector signals, each first detector signal representing a particular first return pulse;

c) repeatedly generating second send pulses, each second send pulse comprising at least three second light beams disposed along the second axis at irregular distances from one another, the second light beams substantially perpendicular to the second axis and aimed at the distribution to repeatedly cause second return pulses to be reflected from the distribution, each second return pulse corresponding to a particular second send pulse;

d) repeatedly receiving the second return pulses with the detector and repeatedly producing second detector signals, each second detector signal representing a particular second return pulse; and e) calculating the first axis projection and the second axis projection of the velocity of the distribution in response to the repeatedly produced first and second detector signals.

31. The method claimed in claim 30, wherein steps a and c are performed together in alternating fashion with steps c and d performed together.

32. The method claimed in claim 30, wherein the irregular distances of the first light beams are different from the irregular distances of the second light beams.

33. The method claimed in claim 30, further comprising storing data representing the first detector signals and the second detector signals.

34. The method claimed in claim 30, wherein repeatedly producing first detector signals comprises producing a net first detector signal using a background function.

35. The method claimed in claim 30, wherein repeatedly receiving the first return pulses comprises sampling each first return pulse at a plurality of predetermined time intervals following the corresponding first send pulse, and wherein repeatedly receiving the second return pulses comprises sampling each second return pulse at a plurality of time intervals following the corresponding second send pulse, and wherein calculating the first axis projection and the second axis projection comprises calculating a plurality of first axis projections and second axis projections, wherein each projection is calculated in response to a plurality of the first and second return pulses sampled at the same time interval as eachother, whereby each time interval corresponds to an altitude at which the projections are calculated.

36. The method claimed in claim 30, wherein calculating the first axis projection and the second axis projection comprises calculating the logarithm of the ratio of the Fourier transform of the first detector signal to the Fourier transform of the second detector signal.

37. The method claimed in claim 30, wherein calculating the first and second axis projections comprises determining best-fit values fitted over all relevant frequencies for the reciprocals of the apparent velocities of the distribution along the first and second axes using a formula, the formula comprising:

$$\ln\left[\frac{F[S_x(t)]}{F[S_y(t)]} R^{\&1}\right] \ni \sum_{n\ni 0}^{\infty} \frac{(\& i\omega)^n}{n!} (c_x^n \kappa_{n,x} \& c_y^n \kappa_{n,y})$$

wherein: $F[S_x(t)]$ represents the Fourier transform of the first detector signal, $F[S_y(t)]$ represents the second detector signal, R represents the ratio of the sum total intensity of the first light beams to the sum total intensity of the second light beams, $\kappa_{n,x}$ represents statistical cumulants of the low order moments of the first array, $\kappa_{n,y}$ represents statistical cumulants of the low order moments of the second array, $c_x$ represents the reciprocal of the apparent velocity of the distribution along the first axis, $c_y$ represents the reciprocal of the apparent velocity of the distribution along the second axis, and $\omega$ represents one of the relevant frequencies.

* * * * *